United States Patent
Kong et al.

(10) Patent No.: US 6,473,619 B1
(45) Date of Patent: Oct. 29, 2002

(54) MOBILE STATION POSITIONING SYSTEM AND METHOD IN MOBILE COMMUNICATION SYSTEM

(75) Inventors: Seung-Hyun Kong; Hi-Chan Moon, both of Seoul (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/397,197

(22) Filed: Sep. 16, 1999

(30) Foreign Application Priority Data

Sep. 16, 1998 (KR) .......................................... 98-38278

(51) Int. Cl.[7] .............................................. H04M 9/00
(52) U.S. Cl. ...................... 455/456; 455/457; 342/450; 340/988
(58) Field of Search ................................ 455/456, 457, 455/432, 422, 522, 524; 342/457, 350, 450, 357.09; 340/988, 991

(56) References Cited

U.S. PATENT DOCUMENTS

| | | | |
|---|---|---|---|
| 5,293,645 A | 3/1994 | Sood | |
| 5,646,632 A | 7/1997 | Khan et al. | |
| 5,970,414 A | * 10/1999 | Bi et al. .................... | 455/456 |
| 6,097,712 A | * 8/2000 | Secord et al. .............. | 370/335 |
| 6,151,512 A | * 11/2000 | Chheda et al. ............. | 455/562 |
| 6,154,659 A | * 11/2000 | Jalali et al. ................ | 455/522 |
| 6,173,188 B1 | * 1/2001 | Kim .......................... | 455/522 |
| 6,229,844 B1 | * 5/2001 | Kong ........................ | 375/150 |
| 6,236,365 B1 | * 5/2001 | LeBlanc et al. ........... | 342/457 |
| 6,275,186 B1 | * 8/2001 | Kong ........................ | 342/363 |

FOREIGN PATENT DOCUMENTS

WO WO 99/21388 4/1999

* cited by examiner

*Primary Examiner*—Dwayne Bost
*Assistant Examiner*—Sonny Trinh
(74) *Attorney, Agent, or Firm*—Dilworth & Barrese, LLP

(57) ABSTRACT

A mobile station positioning method is provided wherein a mobile station receives signals synchronized and transferred from at least three neighboring base stations at a predetermined time, wherein the mobile station belongs to one serving base station out of the at least three neighboring base stations. The mobile station positioning method including the steps of performing a forward transmission power control at at least one of the three neighboring base stations; calculating, at the mobile station, arrival time differences between two of the signals received from the at least three neighboring base stations; transmitting, at the mobile station, the arrival time differences to the serving base station; and estimating, at the serving base station, a position of the mobile station using the arrival time differences. A mobile station positioning system is also provided including at least three neighboring base stations for transmitting signals synchronized at a predetermined time and controlling forward transmission power of the signals during a scheduled time interval; a mobile station calculating arrival time differences between two of the signals received from the at least three neighboring base stations; and a serving base station included in the at least three neighboring base stations for receiving the arrival time differences from the mobile station and determining a position of the mobile station using the arrival time differences.

14 Claims, 21 Drawing Sheets

MOBILE STATION POSITIONING SYSTEM AND METHOD IN MOBILE COMMUNICATION SYSTEM

PRIORITY

This application claims priority to an application entitled "Mobile Station Positioning Device And Method in Mobile Communication System" filed in the Korean Industrial Property Office on Sep. 16, 1998 and assigned Serial No. 98-38278, the contents of which are hereby incorporated by reference.

BACKGROUND OF THE INVENTION

1. Field of the Invention

The present invention relates generally to a mobile communication system, and more particularly, to a mobile station positioning device and method in a mobile communication system.

2. Description of the Related Art

The FCC (Federal Communications Commission) demands that a service for positioning all mobile stations (MS) at probability of 67% within a permitted error limit of 125 meters should be implemented by October 2001 for emergency 911, E911. Designers are attempting to implement this service using a reverse link FICTION called PUF (Power Up Function) in the IS-95 CDMA (Code Division Multiple Access) standard supplied by TIA/EIA, as well as in the IMT(International Mobile Telecommunication)-2000 system.

The PUF is a function for measuring the distance between a mobile station and each of a plurality of neighboring base stations. The PUF uses the phenomenon that in case of emergency, the mobile station increases transmission power to the plurality of neighboring base stations. Each of the plurality of neighboring base stations then estimates the time required to receive signals from the mobile station. Accordingly, each of the plurality of neighboring base stations can then calculate their distance to the mobile station. However, the PUF is defined in the IS-95B standard, and therefore, the PUF causes an increase in interference. Thus, system efficiency and performance decreases.

SUMMARY OF THE INVENTION

It is, therefore, an object of the present invention to provide a mobile station positioning device and method using arrival time differences or time difference of arrivals (TDOAs) calculated with signals received from a plurality of neighboring base stations to the mobile station in a synchronized CDMA mobile communication system.

To achieve the above object, there is provided a mobile station positioning method, wherein a mobile station receives signals synchronized and transferred from at least three neighboring base stations at a predetermined time, wherein the mobile station belongs to one serving base station out of the at least three neighboring base stations. The mobile station positioning method including the steps of performing a forward transmission power control at at least one of the three neighboring base stations; calculating, at the mobile station, arrival time differences between two of the signals received from the at least three neighboring base stations; transmitting, at the mobile station, the arrival time differences to the serving base station; and estimating, at the serving base station, a position of the mobile station using the arrival time differences.

A mobile station positioning system is also provided including at least three neighboring base stations for transmitting signals synchronized at a predetermined time and controlling forward transmission power of the signals during a scheduled time interval; a mobile station calculating arrival time differences between two of the signals received from the at least three neighboring base stations; and a serving base station included in the at least three neighboring base stations for receiving the arrival time differences from the mobile station and determining a position of the mobile station using the arrival time differences.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention described herein suggests a mobile station positioning system and method capable of not only preventing degradation of system performance caused by increased interference as in the prior art mobile station positioning system which uses PUF, but also capable of providing a continuous positioning service. The principle of the present invention is a mobile station positioning method using the distance between a mobile station (MS) and each of a plurality of base stations (BS) calculated using forward link channels in a CDMA mobile communication system.

The mobile station positioning method of the present invention may be divided into two categories: the first category is calculating time of arrivals (TOAs) between two positions (MS–BS); and the other category is calculating two arrival time differences or two time difference of arrivals (TDOAs) between signals received at a mobile station from at least three neighboring base stations and determining a relative location of the mobile station with respect to the base stations. In the present invention, there will be described a mobile station positioning method using TDOAs in a synchronized CDMA communication system, i.e., the second category.

Although only forward pilot channels are established as a medium for determining the distance between a base station and a mobile station in the following description, any other channel can also be used in the present invention so long as it is shared between all (or specified) mobile stations. Examples of such channels used in the present IS-95 system include pilot channel, auxiliary pilot channel, syn channel and paging channel. For simplicity, the description will be made regarding only a forward pilot channel.

The present invention is directed to a mobile station positioning system and method using forward link channels, based on a conception that use is made of forward pilot channels, and uncoded data suitable for timing and phase reference. The method suggested herein is applicable to both need-based positioning and continuous positioning cases. Continuous positioning of a mobile station is possible by utilizing a navigation service. A geographical model of the base stations used herein is a conventional hexagonal cell model composed of six base stations adjoining one base station. This cell model is illustrated in FIG. 1.

Figure 1:
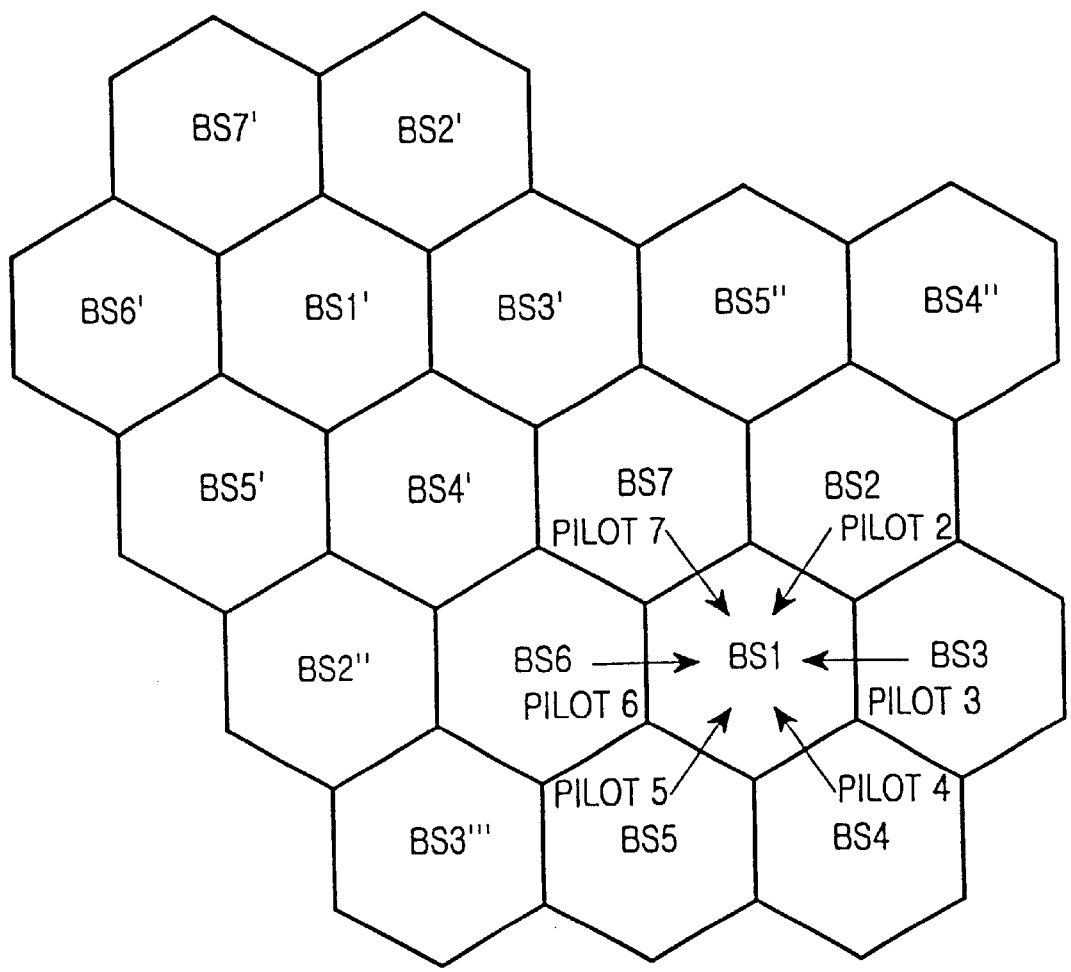
FIG. 1 is a diagram showing a hexagonal cell geometry in which six neighboring base stations surround a serving base station in a mobile communication system according to the prior art.

Referring to FIG. 1, for mobile station positioning, a mobile station has to receive pilot signals with detectable receiving power not only from a service base station BS1 but also from a plurality of neighboring base stations. However, when the mobile station is located in the vicinity of the service base station or the plurality of neighboring base stations, signals transferred from the base stations exhibit interference strong enough to disable the mobile station from receiving pilot signals from the other base stations. Here, the receiving power P1 of the forward pilot signals received from the base station BS1 at a position is defined by Equation 1:

Equation 1:

$$(Ec/It)\big|p1 = \frac{\beta \times p1 \times L(d1)}{[p1 \times L(d1) + \sum(pi \times L(di))]} \quad i = 1, 2, 3, \ldots$$

wherein $\beta$ represents a ratio of pilot transmission power to total transmission power of a base station, $p1$ represents total forward transmission power of a serving base station BS1, $pi$ represents forward transmission power of a neighboring base station $i$, and $di$ represents a distance from the mobile station to the base station $i$, usually expressed by $L(di)=C\times di^{-4}$, wherein C is a constant value.

It is noted from Equation 1 that as the mobile station is distanced from the serving base station 1 and approaches the neighboring base station $i$ ($i=1, 2, 3, \ldots$), $L(d1)$ decreases with $L(di)$ increasing abruptly so that a value of $(Ec/It)$ $p1$ (i.e., a ratio of pilot receiving power to total pilot chip energy with respect to interference of the base station BS1) cannot be maintained despite an increase in P or p1. As described above, in a case where interference from a neighboring base station is dominant, it is difficult for the mobile station to receive pilot signals transmitted from the other base stations.

To enable the mobile station to receive pilot signals from the other neighboring base stations, the present invention suggests a method for eliminating a dominant interference source in an instant by controlling total forward transmission power and transmission power of forward pilot channels from the base station BS1. This procedure is called "FTP (Forward Transmission Power) control" with a time interval shorter than one traffic frame of 20 ms. The present invention also suggests a method for enabling the mobile station to receive pilot signals from the other base stations by increasing pilot transmission power of the other base stations.

Hereafter, a description will be made as to FTP control methods for enabling a mobile station to receive pilot signals with high receiving power from neighboring base stations other than a serving base station.

First, variables used herein are defined as: $\Delta p$ represents a transmission power variation of a pilot channel; $\Delta T$ represents a transmission power variation of channels other than the pilot channel; $\Delta Tx$ represents total forward transmission power variation ($\Delta Tx = p + \Delta T$), the sum of the transmission power variation of the pilot channel and the transmission power variation of the other channels.

FIGS. 2A through 2F illustrate examples of FTP control for a specific forward channel (e.g., pilot channel) and FTP control for the other channels (e.g., traffic channel), in which a base station performs the FTP controls. The FTP controls are divided into an FTP control for pilot channels and an FTP control for the other channels. FIG. 2 shows that a straight line indicates the forward transmission power out of the FTP control duration. This means that only FTP controls between the base station and the mobile station can change the forward transmission power arbitrarily. There are many possible FTP control methods performed at a serving base station and a neighboring base station (or a plurality of neighboring base stations).

To enable the mobile station to receive pilot signals from neighboring base stations other than a serving base station, total forward transmission power of the serving base station is lowered (in a first method), or transmission power of the forward pilot channels is increased at the neighboring base stations (in a second method). Supposing that forward pilot transmission power of the serving base station is P1 and the neighboring base stations are $BSi(i=2,3,4,5,6,7)$, for example, increasing $\beta$ with P0 being lowered in Equation 1 leads to an increase in the receiving power of pilot signals from a neighboring base station $i$, $Ec/Io$ $((Ec/io)|pi)$.

Figure 2A:
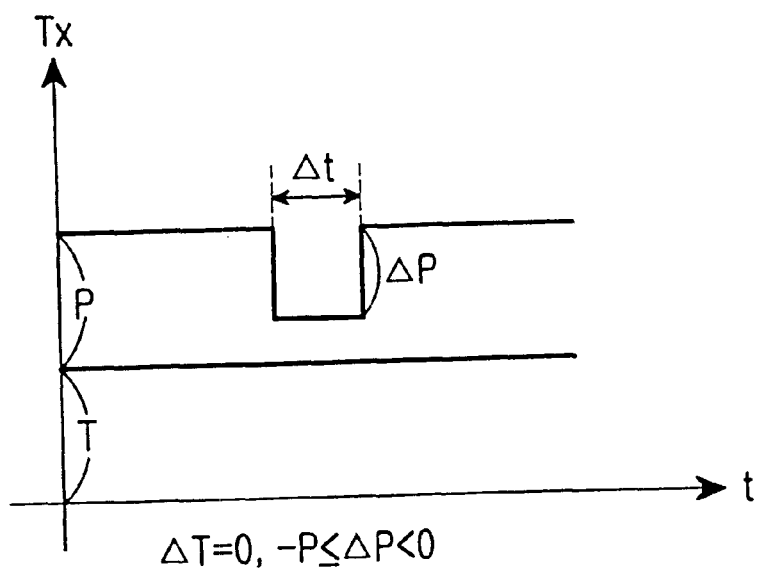
FIGS. 2A–2G are diagrams illustrating examples of forward transmission power (FTP) control for a specific forward channel (e.g., pilot channel) and FTP control for the other channels (e.g., traffic channels), in which a base station performs the FTP control according to the present invention.
Figure 2B:
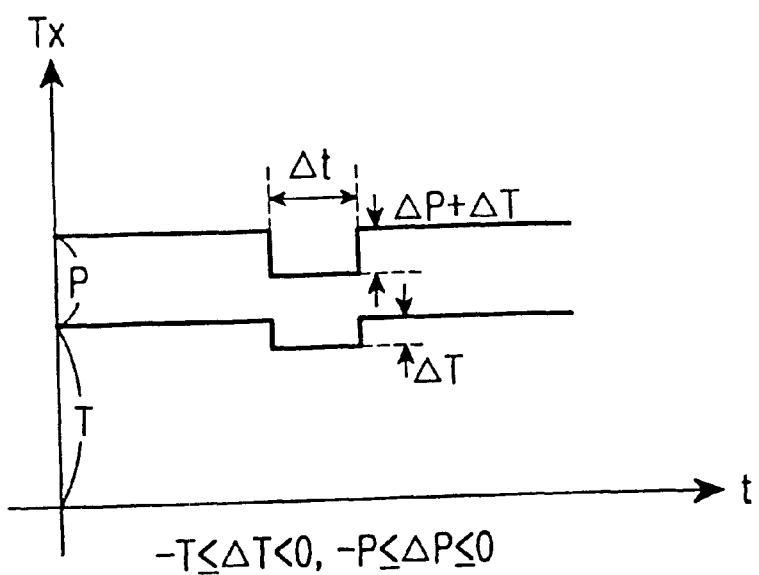
Figure 2C:
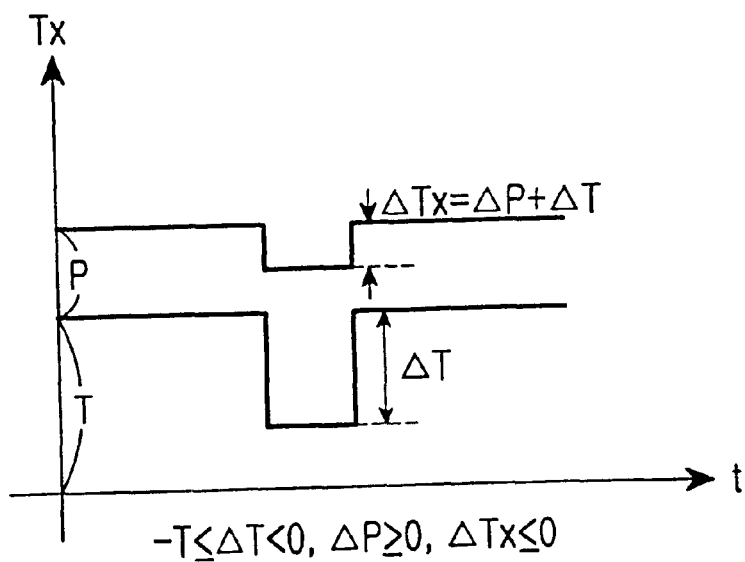

For lowering total forward transmission power, there are three methods used herein: (1) decreasing transmission power of the forward pilot channels only (see. FIG. 2A); (2) decreasing transmission power of all other channels as well as the forward pilot channels (see. FIG. 2B); and (3) increasing transmission power of the forward pilot channels but further lowering transmission power of the other channels more than the pilot transmission power increment (see. FIG. 2C).

Figure 2D:
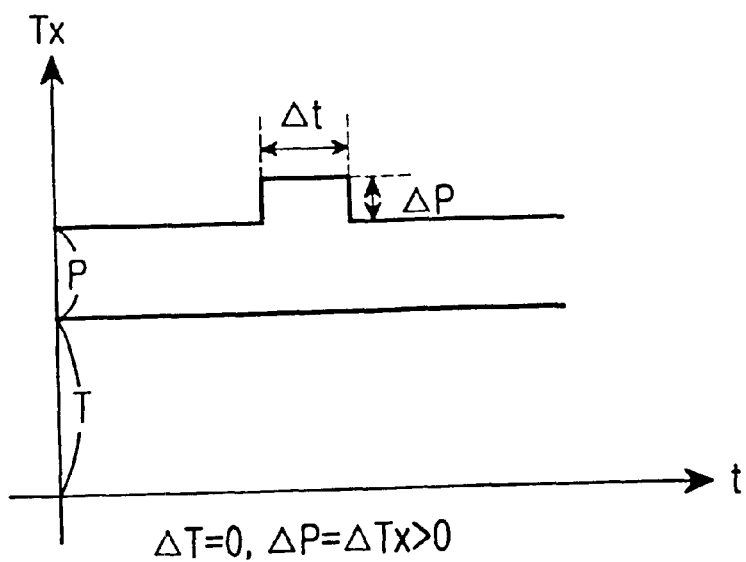
Figure 2E:
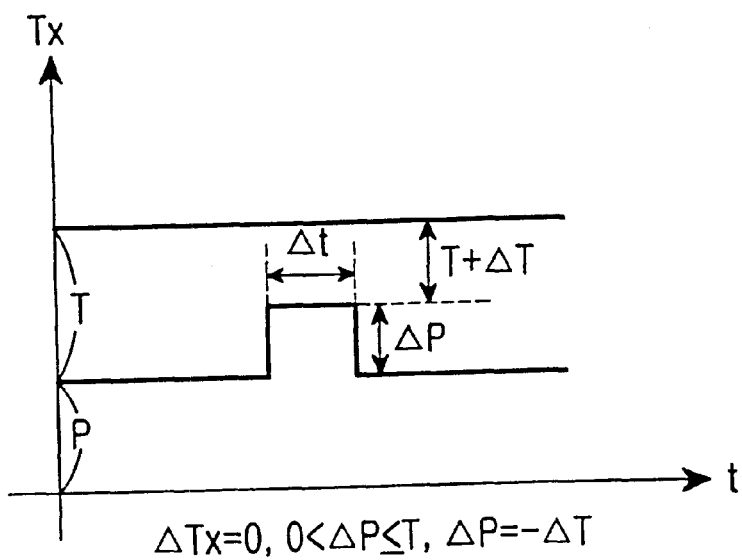
Figure 2F:
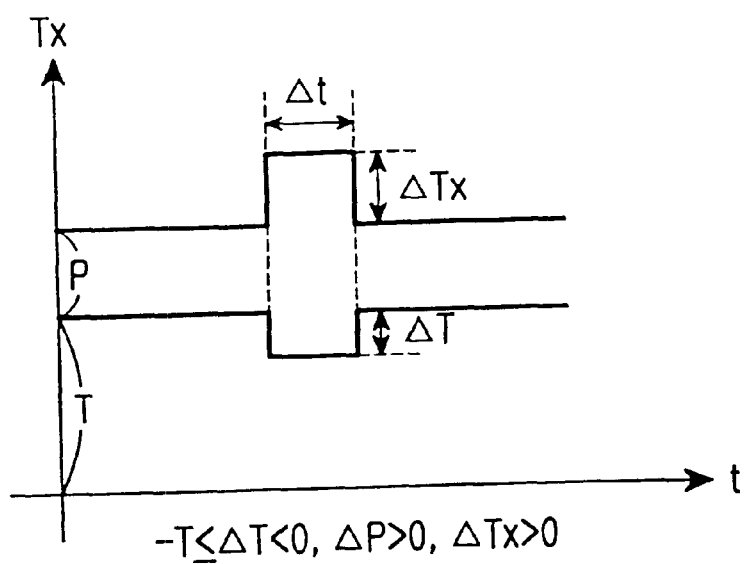

In contrast, for increasing total forward transmission power (or increasing transmission power of the forward pilot channels), there are three methods used herein: (1) increasing transmission power of the forward pilot channels only without arbitrarily changing transmission power of the other forward channels (see. FIG. 2D); (2) increasing transmission power of the forward pilot channels but lowering transmission power of the other forward channels to maintain total forward transmission power (see. FIG. 2E); and (3) increasing transmission power of the forward pilot channels further than in FIG. 2E to increase total forward transmission power (see. FIG. 2F).

Also, both the serving base station and the neighboring base stations can increase forward transmission power, of the pilot channels. Here, the serving base station and the neighboring base stations perform equally one of the methods as described in FIGS. 2D to 2F or selectively perform the methods. In a case where all base stations increase forward pilot transmission power as shown in FIGS. 2D to 2F, the FTP controls are performed at the same time or at different times being increased by at least one frame.

In another method, only a certain base station performs the FTP control as described in FIGS. 2D to 2F and the other base stations do not perform the FTP control, thus enabling the mobile station to receive pilot signals from the neighboring base stations.

There are cases where the mobile station fails to receive traffic channel data during an FTP control duration when both the serving base station and the neighboring base stations increase forward pilot transmission power and when only a certain base station performs the FTP control. Here, the base station performing the FTP control has to maintain a frame error rate (FER) of the forward traffic channels by increasing pilot transmission power during the FTP control duration. This method will be described later with reference to FIG. 10.

There is further another method in which the serving base station increases forward pilot transmission power with the neighboring base stations not performing an FTP control. Here, transmission power of all forward channels from the neighboring base stations is not changed arbitrarily except that forward traffic channels are power controlled according to the IS-95 standard.

Figure 2G:
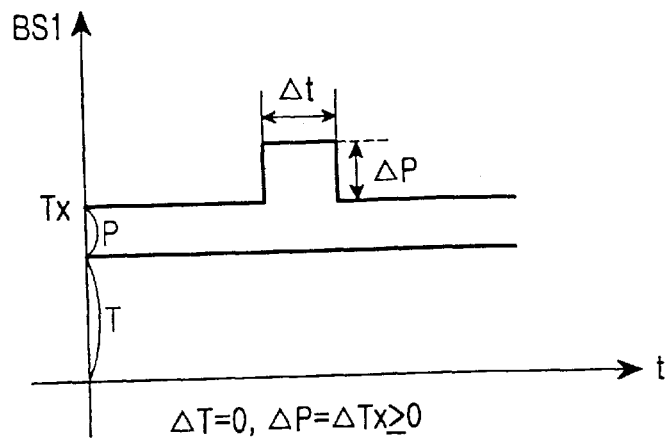
Figure 2G:
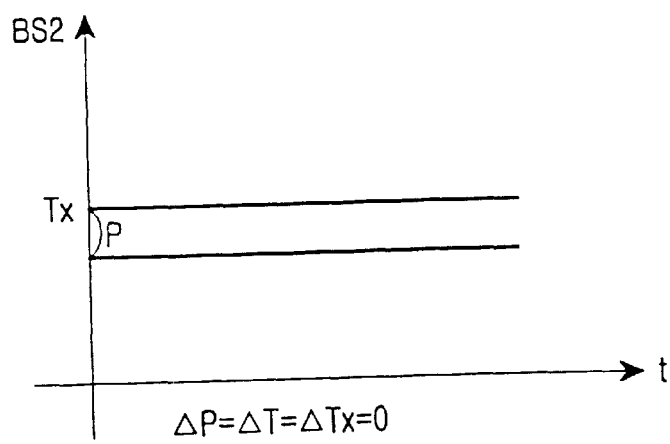
Figure 2G:
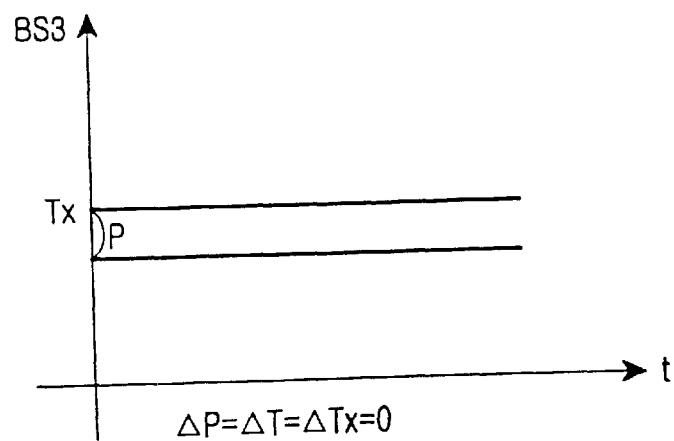

FIG. 2G illustrates a situation where base stations differ in transmission power of all forward traffic channels and hence differ in pilot transmission power increment ΔP, wherein all the base stations perform the same FTP control as described in FIG. 2F.

As shown in FIG. 2F, pilot transmission power increment ΔP can be increased as much as the transmission power of all forward traffic channels. If the base stations differ in the pilot transmission power, the individual base station gradually increases the pilot transmission power prior to FTP control so as to have the same transmission power of pilot signals output during the FTP control. After the FTP control, the individual base station gradually lowers the pilot transmission power to the original level. Here, the gradual transmission power variations of the pilot signals are limited to several milliseconds.

A description will be made in connection with FIG. 2H as to mixed examples of FTP controls as described in FIGS. 2A–2G.

Figure 2H:
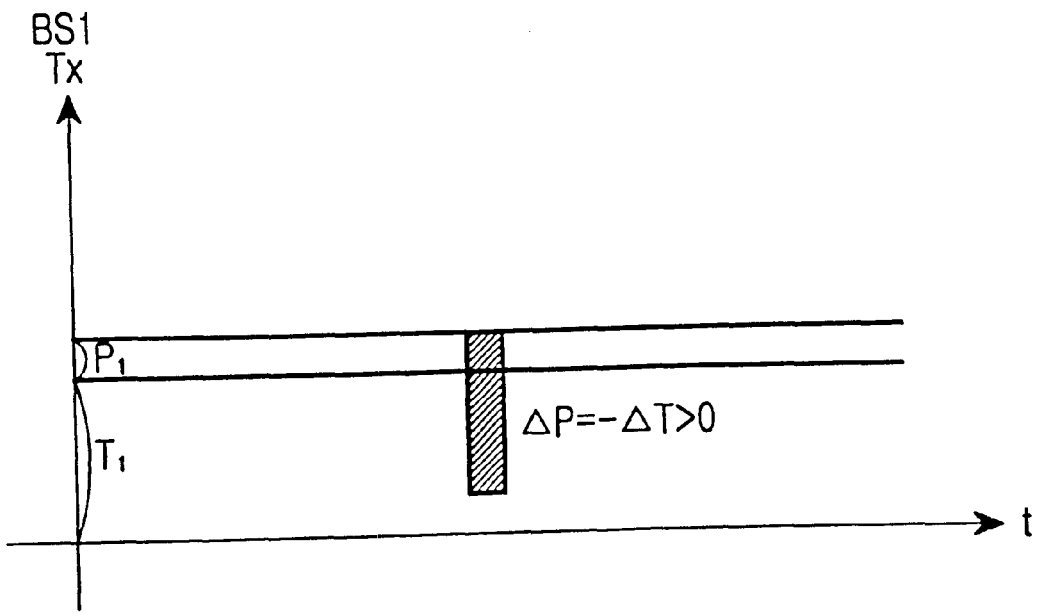
FIG. 2H is a diagram illustrating an example of FTP control of a base station and two neighboring base stations according to the present invention.
Figure 2H:
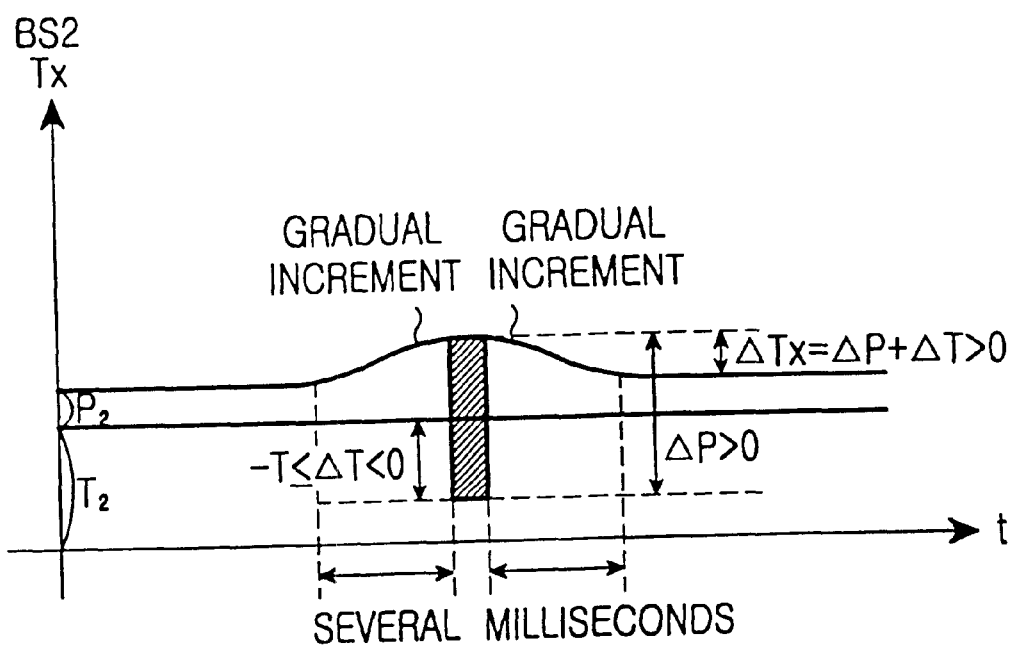

Referring to FIG. 2H, a neighboring base station (in FIG. 2G, a mobile station receives pilot signals from a base station) increases transmission power of forward pilot channels only and hence increases total forward transmission power, whereas the other neighboring base stations (two base stations 2 and 3 are shown) do not change forward transmission power arbitrarily during an FTP control duration, as described in FIG. 2D. As a result, the mobile station receives a desired pilot signal from the base station BS1 during the FTP control duration and stores the received pilot signal (chip sample data) in a temporary memory buffer. Then, the mobile station uses the stored chip sample data to calculate TDOAs through a searcher, or transmits them to the base station so that the base station or an upper system can position the mobile station or update the position data of the mobile station.

Figure 3A:
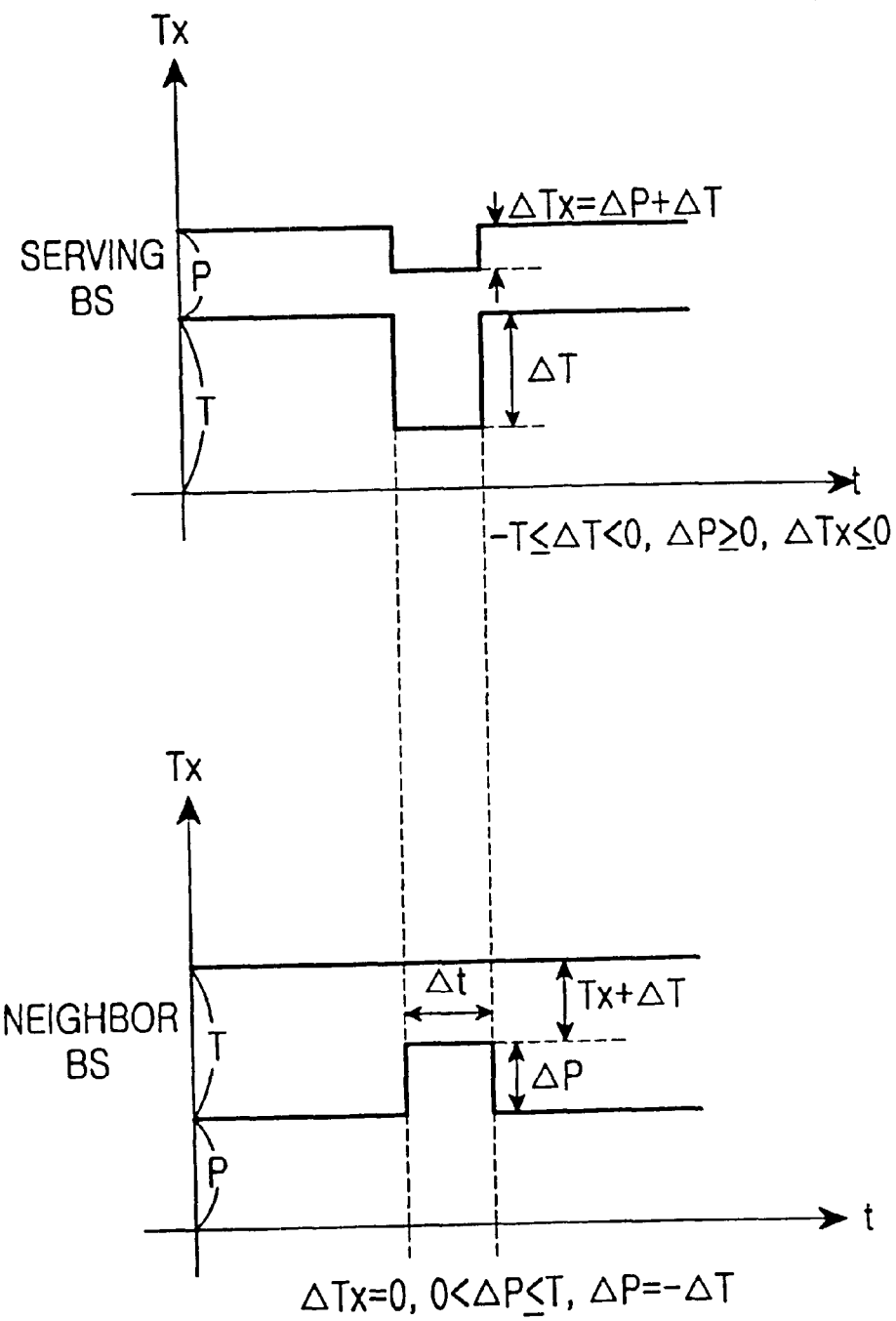
FIGS. 3A and 3B are diagrams illustrating examples of FTP control of a serving base station and neighboring base stations for enabling a mobile station to receive multiple forward channel signals according to an embodiment of the present invention.
Figure 3B:
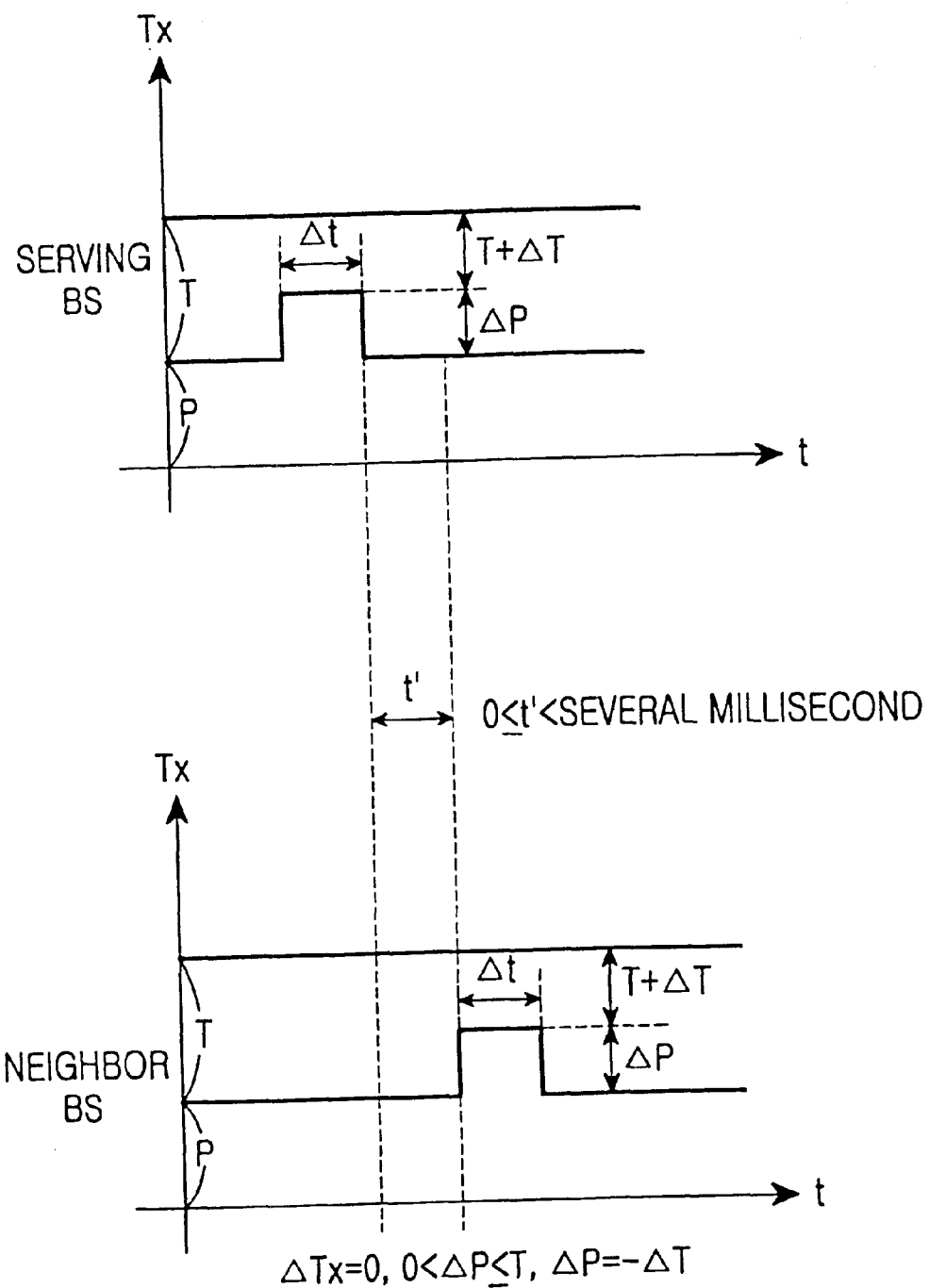

FIGS. 3A and 3B illustrate examples that a serving base station or a plurality of base stations perform FTP control for enabling a mobile station to receive multiple forward channel signals according to an embodiment of the present invention.

Referring to FIG. 3A, the serving base station increases transmission power of forward pilot channels and lowers transmission power of the other channels much more than the pilot transmission power decrement to decrease total forward transmission power, as described in FIG. 2C. However, the neighboring base stations increase transmission power of forward pilot channels with transmission power of the other channels lowered so as to maintain total forward transmission power, as described in FIG. 2E. That is, the mobile station can be enabled to receive pilot signals from the neighboring base stations with higher receiving power by lowering total transmission power of the serving base station but increasing pilot transmission power of the neighboring base stations.

Referring to FIG. 3B, the serving base station and the neighboring base stations perform the same FTP control procedure as described in FIG. 2E except that they differ in the FTP control durations. That is, both the serving base station and the neighboring base stations increase transmission power of forward pilot channels and lower transmission power of the other forward channels so as to maintain total forward transmission power. Here, the FTP control is performed at intervals of t' (0≦t'<several milliseconds) such that the mobile station can receive pilot signals from the neighboring base stations every time the individual base station performs the FTP control.

Reference will be made in connection with FIG. 4 regarding a structure of a base station transmitter capable of performing the above-described FTP controls.

First, a controller 411 enables (or disables) an operation of a individual channel generator in a base station. Specifically, the controller 411 processes a physical layer message communicated with the base stations and communicates the message with the upper layer. Pilot channel generator 412, sync channel generator 413, and paging channel generator 414 generate common channel information shared between mobile stations in a single cell or a plurality of cells. Fundamental channel generator 415, supplemental channel generator 416, and dedicated control channel generator 517 generate subscriber dedicated channel information which is not shared between the mobile stations.

The dedicated control channel generator 417 processes various control messages on a forward link dedicated control channel DCCH and transmits them to the mobile station. Now, a description will be made as to an operation of the dedicated control channel generator 417. The messages transmitted on the forward link dedicated control channel include RLP (Radio Link Protocol) frames or different control messages (e.g., an L3 signaling message) used in the IS-95B system, and other control messages related to packet data service control, such as assignment and release of supplemental channels. The power control signal can be transmitted on the dedicated control channel when the fundamental channel is not used. In this case, the control messages may contain the power control signals. The dedicated control channel generator 417 negotiates with a base station about a data rate for the supplemental channel at the forward link dedicated control channel DCCH, or in some cases sends a command to change orthogonal codes which are used for the supplemental channel.

The pilot channel generator 412 processes information transmitted on a forward link pilot channel and sends it to the mobile station. The forward link pilot channel is used to transmit logic signals that are all "0" or "1". It is assumed herein that the logic signals output to the pilot channel are all "0". The pilot channel signals enable the mobile station to make rapid initial acquisition for new multiple paths and channel estimation. The pilot channel is assigned with one predetermined orthogonal code to spread the pilot channel signals.

The sync channel generator 413 processes information transmitted on a forward link sync channel and sends it to the mobile station. The information transmitted on the sync channel enables multiple mobile stations within one cell to acquire initial time synchronization and frame synchronization. The forward link sync channel is assigned with one predetermined Walsh code to spread the sync channel information.

The paging channel generator 414 processes information transmitted on a forward link paging channel and sends it to the mobile station. The information transmitted on the paging channel includes all information required prior to establishment of a communication channel. The forward link paging channel is assigned with one predetermined orthogonal code selected to spread the paging channel information.

The fundamental channel generator 415 processes information transmitted on a forward link fundamental channel and sends it to the mobile station. The information transmitted on the fundamental channel includes basically voice signals. In addition to voice signals, the information may include different control messages (e.g., an L3 signaling message) used in the IS-95B system and power control signals. If necessary, an RLP frame and an MAC (Multiple Access Code) message, etc. can be contained in the signal transmitted on the fundamental channel. The fundamental channel generator 415 is assigned with one available orthogonal code which is not assigned to the pilot channel generator 412, the sync channel generator 413 or the paging channel generator 414 and spreads the fundamental channel signal.

The supplemental channel generator 416 processes information transmitted on a forward link supplemental channel and sends it to the mobile station. The information transmitted on the supplemental channel includes an RLP frame, packet data and the like. The supplemental channel generator 416 has a scheduled data rate of greater than 9.6 kbps. It means that the base station negotiates for a data rate with the mobile station via the dedicated control channel and communicates data with the mobile station at the scheduled data rate. The forward link supplemental channel generator 416 is assigned with one available orthogonal code which is not assigned to the pilot channel generator 412, the sync channel generator 413 or the paging channel generator 414 and spreads the supplemental channel signal. Here, the fundamental channel and the supplemental channel become traffic channels.

Figure 4:
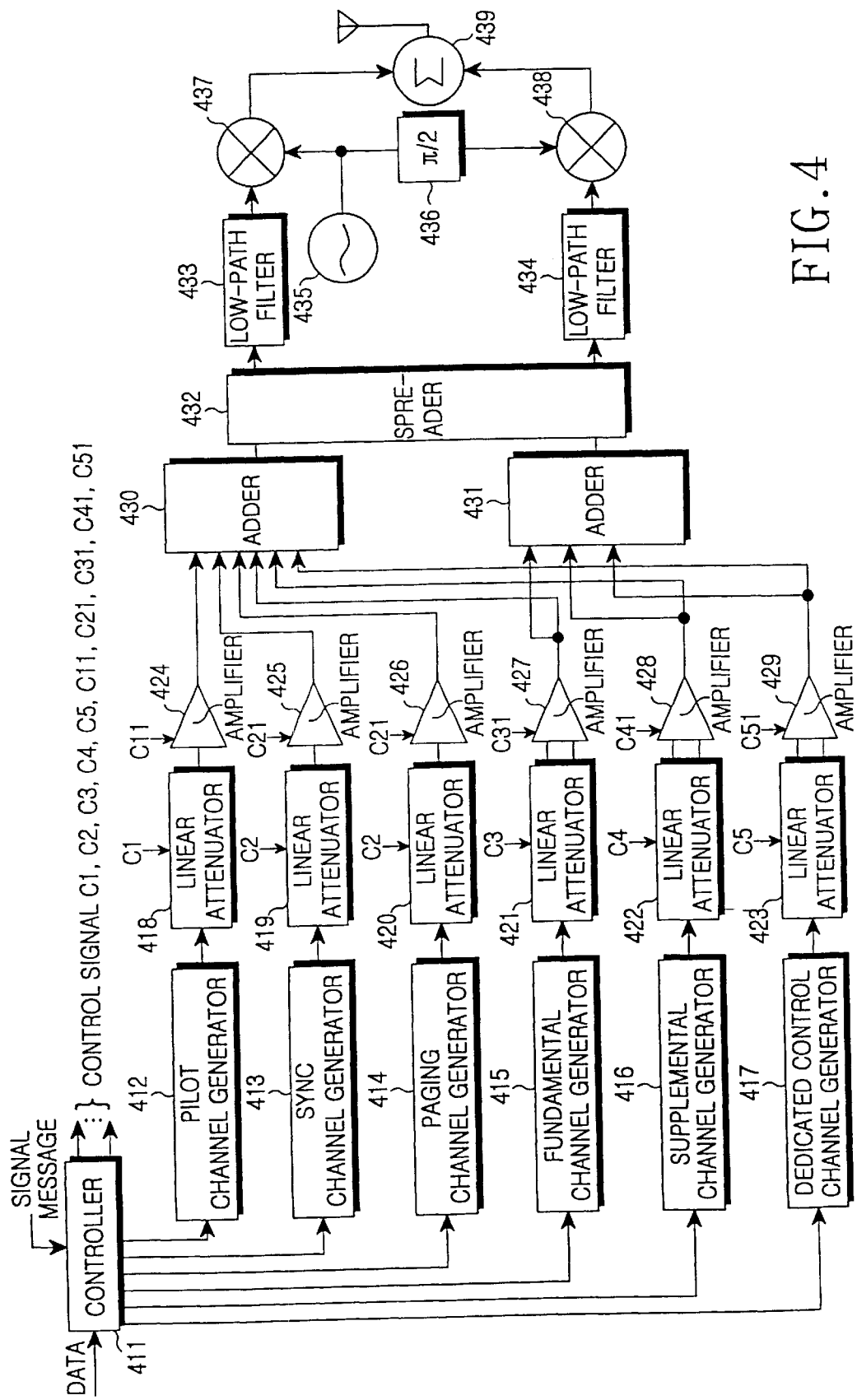
FIG. 4 is a diagram illustrating the construction of a base station transmitter for FTP control according to an embodiment of the present invention.

As illustrated in FIG. 4, in a CDMA communication system according to an embodiment of the present invention, the base station includes the controller 411 for controlling all channels, and the pilot channel generator 412, the sync channel generator 413, the paging channel generator 414, the fundamental channel generator 415, the supplemental channel generator 416 and the dedicated control channel generator 417 for processing signals transmitted on the respective channels. The fundamental channel generator 415, the supplemental channel generator 416 and the dedicated control channel generator 417 generate two channel signals of I-(In-phase) channel component and Q-(Quadrature-phase) channel component, whereas the pilot channel generator 412, the sync channel generator 413, the paging channel generator 414 generate signals of one channel component. It is assumed herein that the one channel component is the I-channel component.

A linear attenuator 418 attenuates an output signal of the pilot channel generator 412 to a predetermined strength according to a control signal C1 of the controller 411. A power amplifier 424 amplifies an output signal of the linear attenuator 418 to a corresponding strength according to a control signal C11 of the controller 411.

Linear attenuators 419 and 420 attenuate output signals of the sync channel generator 413 and the paging channel generator 414 to a predetermined strength, respectively, according to a control signal C2 of the controller 411. Power amplifiers 425 and 426 amplify output signals of the linear attenuators 419 and 420 to a predetermined strength, respectively, according to a control signal C21 of the controller 411.

A linear attenuator 421 attenuates an output signal of the fundamental channel generator 415 to a predetermined strength according to a control signal C3 of the controller 411. A power amplifier 427 amplifies an output signal of the linear attenuator 421 to a predetermined strength according to a control signal C31 of the controller 411.

A linear attenuator 422 attenuates an output signal of the supplemental channel generator 416 to a predetermined strength according to a control signal C4 of the controller 411. A power amplifier 428 amplifies an output signal of the linear attenuator 422 to a predetermined strength according to a control signal C41 of the controller 411.

A linear attenuator 423 attenuates an output signal of the dedicated control channel generator 417 to a predetermined strength according to a control signal C5 of the controller 411. A power amplifier 429 amplifies an output signal of the linear attenuator 423 to a predetermined strength according to a control signal C51 of the controller 411.

An adder 430 adds forward link I-channel signals output from the fundamental channel generator 415, the supplemental channel generator 416 and the dedicated control channel generator 417, and output signals of the pilot channel generator 412, the sync channel generator 413 and the paging channel generator 414. An adder 431 adds forward link Q-channel signals output from the fundamental channel generator 415, the supplemental channel generator 416 and the dedicated control channel generator 417.

A spreader 432 multiplies output signals of the adders 430 and 431 by a spreading sequence and converts the spread signals to a frequency of the transmission signals.

Low-pass filters 433 and 434 are normal low-pass filters for confining the transmission signals within a specified frequency band. A carrier generator 435 generates carriers for the transmission signals and outputs them to a mixer 437 and a π/2-phase converter 436. The π/2-phase converter 436 converts the phase of an output of the carrier generator 435 by π/2 such that the I-channel components are orthogonal with the Q-channel components. The mixer 437 multiplies an output of the low-pass filter 433 by an output of the carrier generator 435 and outputs the resulting signal to an adder 439. A mixer 438 multiplies an output of the low-pass filter 434 by an output of the π/2-phase converter 436 and outputs the resulting signal to an adder 439. The adder 439 adds the outputs of the mixers 437 and 438 and transmits the resulting signal via an antenna.

As described above, the base station according to the present invention performs FTP controls using the multiple channel generators 412 to 417 and the controller 411 according to control signals C1–C5 and C11–C51 generated from the controller 411. The control signal C1 controls the linear attenuator 418 to attenuate the pilot channel signal, and the control signal C11 controls the power amplifier 424 to amplify the pilot channel signal. The control signal C2 controls the linear attenuators 419 and 420 to attenuate the sync channel signal and the paging channel signal, and the control signal C21 controls the power amplifiers 425 and 426 to amplify the sync channel signal and the paging channel signal. The control signal C3 controls the linear attenuator 421 to attenuate the fundamental channel signal, and the control signal C31 controls the power amplifier 427 to amplify the fundamental channel signal. The control signal C4 controls the linear attenuator 422 to attenuate the supplemental channel signal, and the control signal C41 controls the power amplifier 428 to amplify the supplemental channel signal. The control signal C5 controls the linear attenuator 423 to attenuate the dedicated control channel signal, and the control signal C51 controls the power amplifier 429 to amplify the dedicated control channel signal.

As described above, it is possible to control the forward transmission power in different ways using various control signals output from the controller 411.

For example, a description will be made below as to FTP control according to two possible situations. Here, it is assumed that a situation where a serving base station lowers total transmission power at a scheduled time is called "a first service" and a situation where neighboring base stations increase total transmission power at a scheduled time is called "a second service".

Regarding the first service, there are three FTP control methods: (1) a first FTP control is controlling the linear attenuator 418 to lower transmission power of the pilot channel; (2) a second FTP control is controlling all the linear attenuators 418–423 to lower transmission power of all the respective channels; and (3) a third FTP control is controlling the linear attenuator 418 to increase transmission power of the pilot channel and controlling the linear attenuators 419–423 to lower total transmission power of the other channels much more than the transmission power increment for the pilot channel.

For the second service, there are three FTP control methods: (1) a first FTP control for controlling the amplifier 424 to increase transmission power of the pilot channel only; (2) a second FTP control for controlling the amplifier 424 to increase transmission power of the pilot channel and controlling the attenuators 419–423 to lower total transmission power of the other channels much more than the transmission power increment for the pilot channel; and (3) a third FTP control for controlling the amplifier 424 to increase transmission power of the pilot channel and controlling the attenuators 419–423 to lower total transmission power of the other channels much more than the power transmission increment for the pilot channel.

Although the channels concerned in the FTP controls fall into two groups, i.e., pilot channels and the other channels as stated with reference to the above embodiments, the channels may be differently grouped based on their functions. For instance, the FTP control can be performed for common channels (e.g., pilot channel, sync channel and paging channel), and for the other channels (e.g., fundamental channel, supplemental channel and dedicated control channel).

The description has been made regarding basic FTP control methods irrespective of a frequency channel structure of the base stations. However, there may exist different types of base stations, such as a base station supporting a direct spreading frequency channel structure, a base station supporting a multicarrier forward channel structure and a base station supporting both the direct spreading frequency channel structure and the multicarrier forward channel structure. Hence, there exist so many FTP control methods according to the channel structure of the base station.

Now, reference will be made in connection with the accompanying drawings as to FTP control methods according to a forward frequency channel structure of the individual base station.

Figure 5:
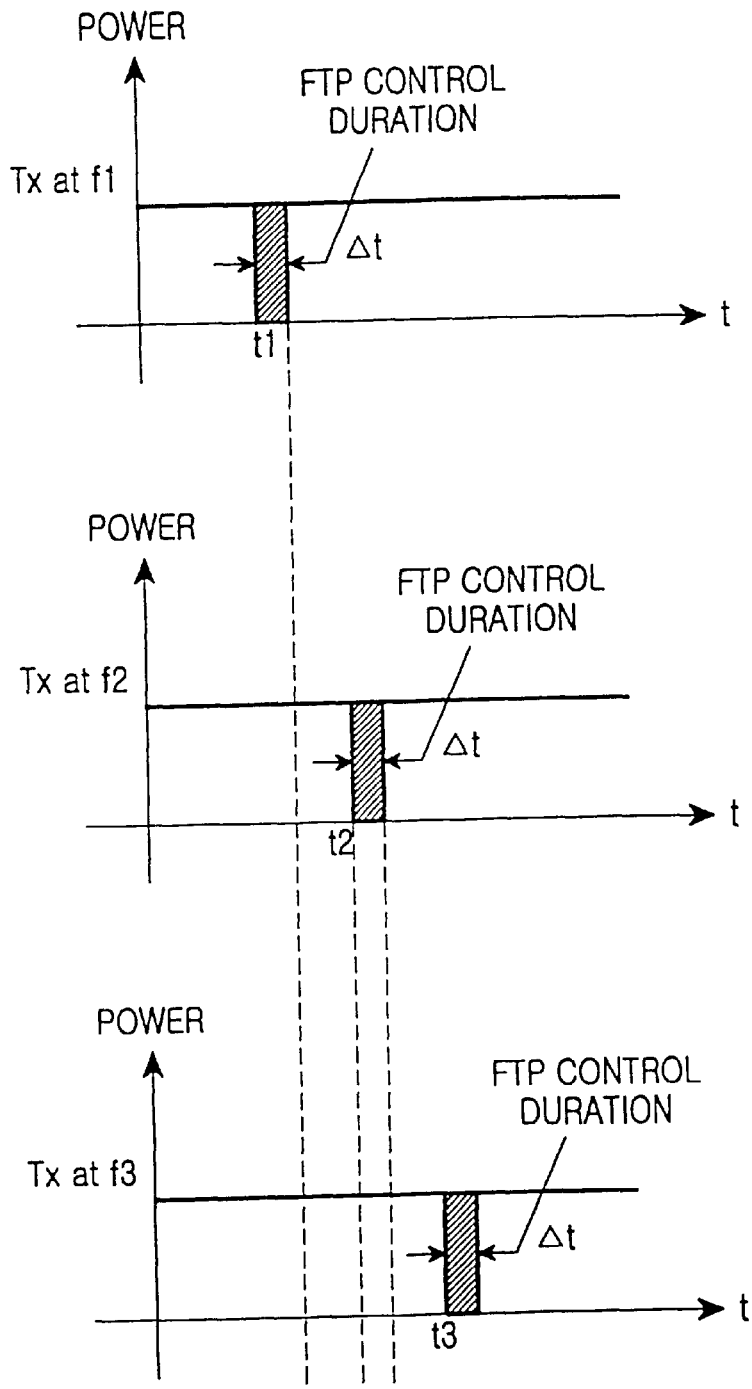
FIG. 5 is a diagram illustrating examples of FTP control of frequency channels at a base station having direct spreading frequency channels of 1.25 MHZ, 5 MHZ and 10 MHZ according to an embodiment of the present invention.

FIG. 5 illustrates examples of FTP control in a case where a serving base station (and neighboring base stations) having a plurality of direct spreading forward frequency channels performs the FTP control.

Referring to FIG. 5, the individual forward frequency channel has a frequency band of 1.25 MHZ (=f1), 5 MHZ (=f2) or 10 MHZ (=f3). As illustrated in FIG. 5, there exist two FTP control methods according to FTP control times: a first method is performing FTP controls at different times (for example, f1=t1, f2=t2, f3=t3, and t1≠t2≠t3); and a second method is performing FTP controls at the same time (t1=t2=t3). In the first method, a mobile station performs interfrequency pilot searching for the respective frequency channels at different times during an interfrequency hard handoff from a base station i to a base station j. Here, the mobile station has received a multicarrier forward channel from the base station i until the handoff and the base station j performs an FTP control for all direct spreading frequency channels at different times. This method can reduce calculations and increase the size of a temporary memory buffer as required when the mobile station performs the interfrequency pilot searching at all frequency bands at the same time.

In the second method, the base stations perform an FTP control for all direct spreading frequency channels with the FTP control times overlapping each other, so that the mobile station that has received the direct spreading forward frequency channels from a base station can measure a pilot signal transmitted on a different direct spreading frequency channel from another base station while the original serving base station is performing an FTP control. As a result, the mobile station can eliminate a loss of forward traffic information caused by the interfrequency pilot searching even at a time other than the FTP control duration.

Figure 6:
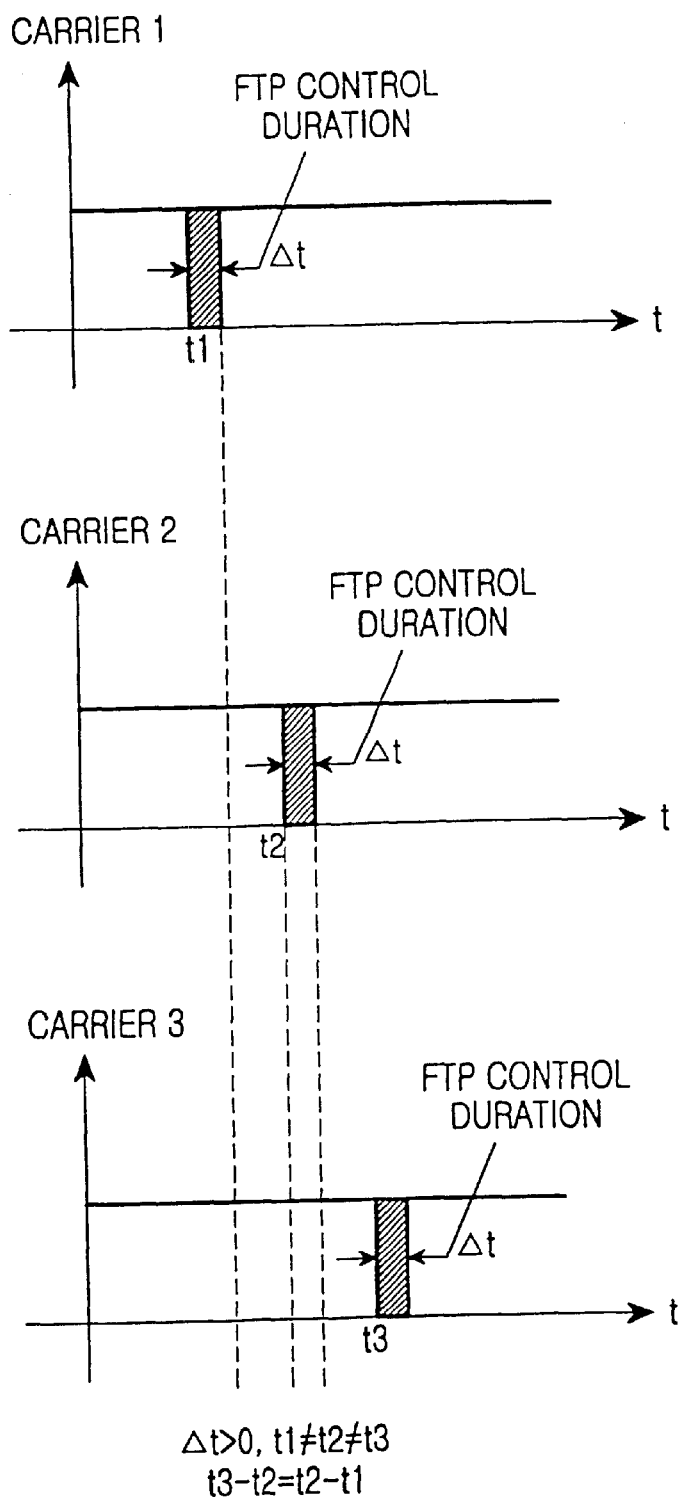
FIG. 6 is a diagram illustrating examples of FTP control of multicarriers at a base station having forward multicarriers according to an embodiment of the present invention.

FIG. 6 illustrates an example of FTP control in a case where a serving base station (and neighboring base stations) having three multicarrier forward channels of 1.25 MHZ performs the FTP control.

The base stations having multicarriers perform FTP controls for the respective frequency channels at the same time, or at different times (e.g., carrier 1=t1, carrier 2=t2, carrier 3=t3, t1≠t2≠t3) as shown in FIG. 6. Here, a mobile station receiving the multicarriers attains frequency diversity when the FTP controls for the respective carriers are performed at the same time. In a case where the FTP controls are performed at different times, the mobile station receiving multicarriers never fails to receive traffic data from the base stations over all carriers at the same time without a need of calculating TDOAs from the chip sample data received via the respective carriers. Also, there is a need of power control for increasing transmission power of all forward traffic channels, thus providing for a case where all mobile stations within a cell fail to receive the forward traffic channels, as in a case where the FTP controls are performed at the same time.

Figure 7:
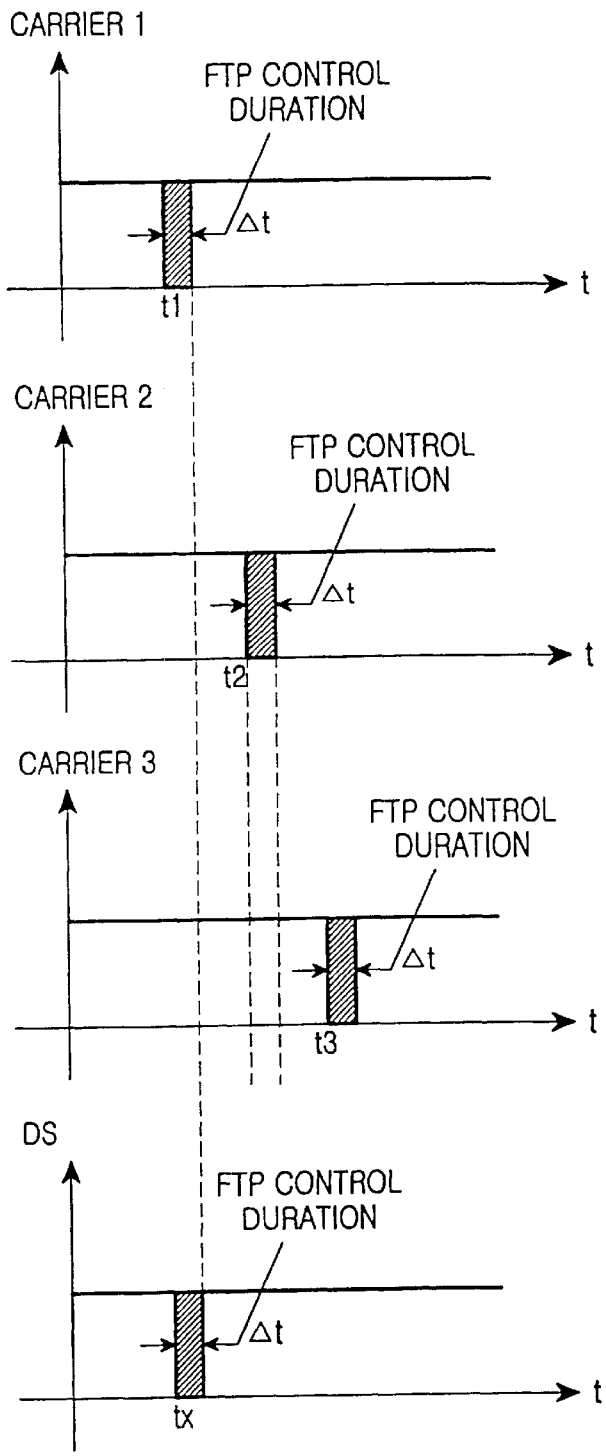
FIG. 7 is a diagram illustrating examples of FTP control at a base station having forward multicarriers and direct spreading frequency channels of 1.25 MHZ, 5 MHZ and 10 MHZ according to an embodiment of the present invention.

FIG. 7 illustrates examples of FTP control, in which a serving base station (and neighboring base stations) having multicarrier forward frequency channels and a direct spreading forward frequency channel performs the FTP control.

Referring to FIG. 7, the FTP control times for the respective multicarrier forward frequency channels are the same as described in FIG. 6 and the FTP control times for the direct spreading forward frequency channel are the same as the FTP control time of one carrier. When the FTP controls for the multicarrier forward frequency channels are performed at the same time, the FTP control time of the direct spreading forward frequency channel is also the same as those of all multicarrier forward frequency channels. This is because the mobile station can perform interfrequency pilot searching at the FTP control time for the carriers when it enters an interfrequency handoff area. In such a case, the mobile station performs interfrequency pilot searching during the FTP control duration for the carriers lest it should twice fail to receive the traffic data on the forward channels.

In the FTP control, there are cases where base stations equally transmit data with lower forward transmission power than is required by a mobile station to increase the FER of a forward traffic channel. That is, transmission power of main forward channels (e.g., fundamental channel, supplemental channel and control channel) is reduced arbitrarily during the FTP control duration. Therefore, the mobile station has to compensate for such a reduction of the transmission power in order to receive data without errors.

Figure 8A:
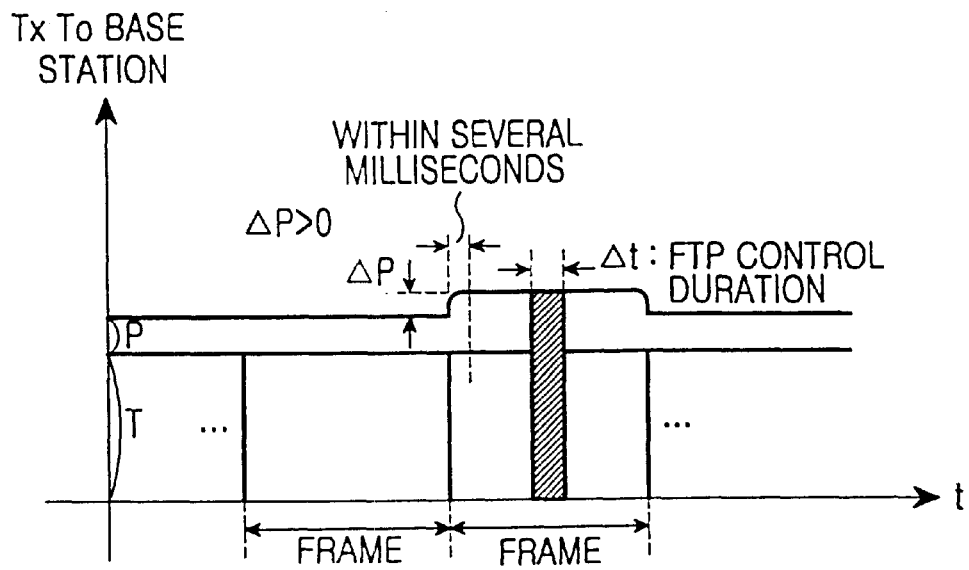
FIGS. 8A to 8C are diagrams illustrating examples of FTP control of pilot channel signals to maintain an FER of forward traffic channels during the FTP control according to an embodiment of the present invention.
Figure 8B:
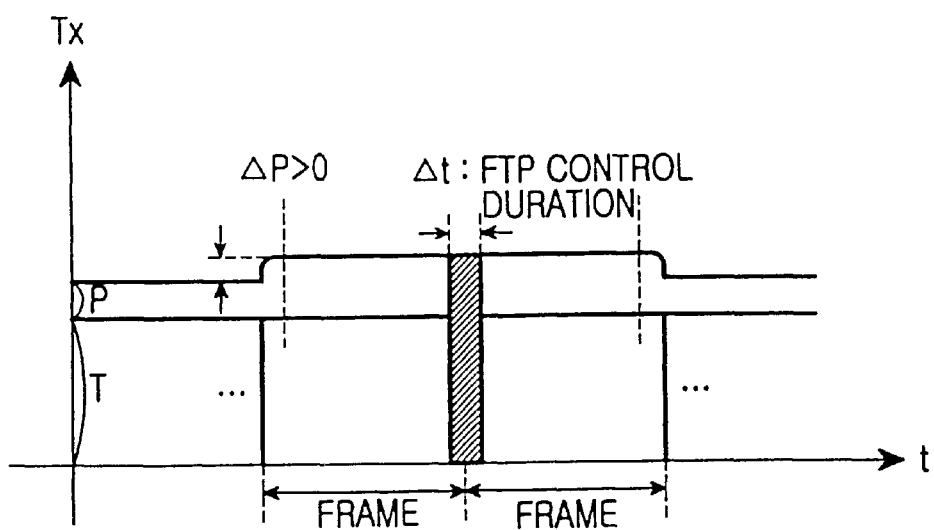

Now, reference will be made in connection with FIGS. 8A–8C as to examples of a compensation method for an FER increased due to the FTP control at a base station. FIG. 8A illustrates an FER compensation when the FTP control duration is included in one traffic frame interval; FIG. 8B illustrates an FER compensation when the FTP control duration overlaps with two traffic frame intervals; and FIG. 8C illustrates another example of the FER compensation described in FIG. 8A.

Referring to FIG. 8A, the base station transmits phase information of a pilot signal to a mobile station with pilot transmission power increased by $\Delta p$ during a traffic frame interval. This enhances coherent detection of the traffic data, thus preventing an increase in the FER. That is, transmission power of the pilot channel is increased during the traffic frame interval other than the FTP control duration $\Delta t$ to compensate for the forward FER.

Referring to FIG. 8B, the base station increases pilot transmission power by $\Delta p$ during two traffic frame intervals that overlap with the FTP control duration, thus compensating for the forward traffic FER. That is, transmission power of the pilot channel is increased in the two traffic frame intervals other than the FTP control duration to compensate for the forward FER. Compared with the compensation method in FIG. 8A, this method is more preferable in that the transmission power increment for the pilot signal can be controlled to be small.

Figure 8C:
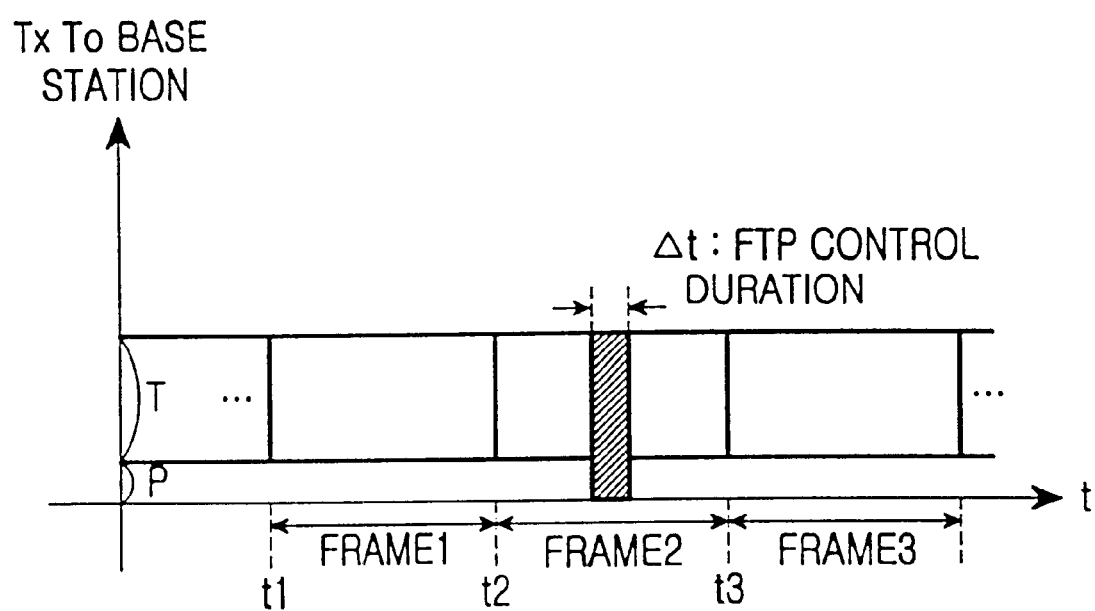

Referring to FIG. 8C, the base station gives a knowledge of the FTP control time t1 or t2 to all mobile stations within a cell in advance and performs FTP control for forward traffic channels to increase a required signal-to-noise ratio Eb/No by a predetermined increment. The base station gives a knowledge of the required signal-to-noise ratio to all mobile stations assigned with forward traffic channels in advance (i.e., prior to t2), or all mobile stations equally increase the signal-to-noise ratio by a predetermined increment after transmission of traffic frames (i.e., after t2). The mobile stations set to control the reception power of traffic channels at the original signal-to-noise ratio when the traffic frames inclusive of the FTP control duration are completely received (i.e., after t3). That is, in a case where the FTP control duration overlaps with two traffic frames, the individual mobile station increases the required signal-to-noise ratio by a predetermined increment at the beginning of the earlier frame and controls power of the forward channels at the original signal-to-noise ratio after the end of the later frame. Therefore, the transmission power controlled during the FTP control duration overlapping with two frames may be lower than the transmission power controlled during an FTP control duration overlapping with one frame.

Now, a description will be made as to a mobile station receiver for receiving and storing positioning data during the FTP control duration.

Figure 9:
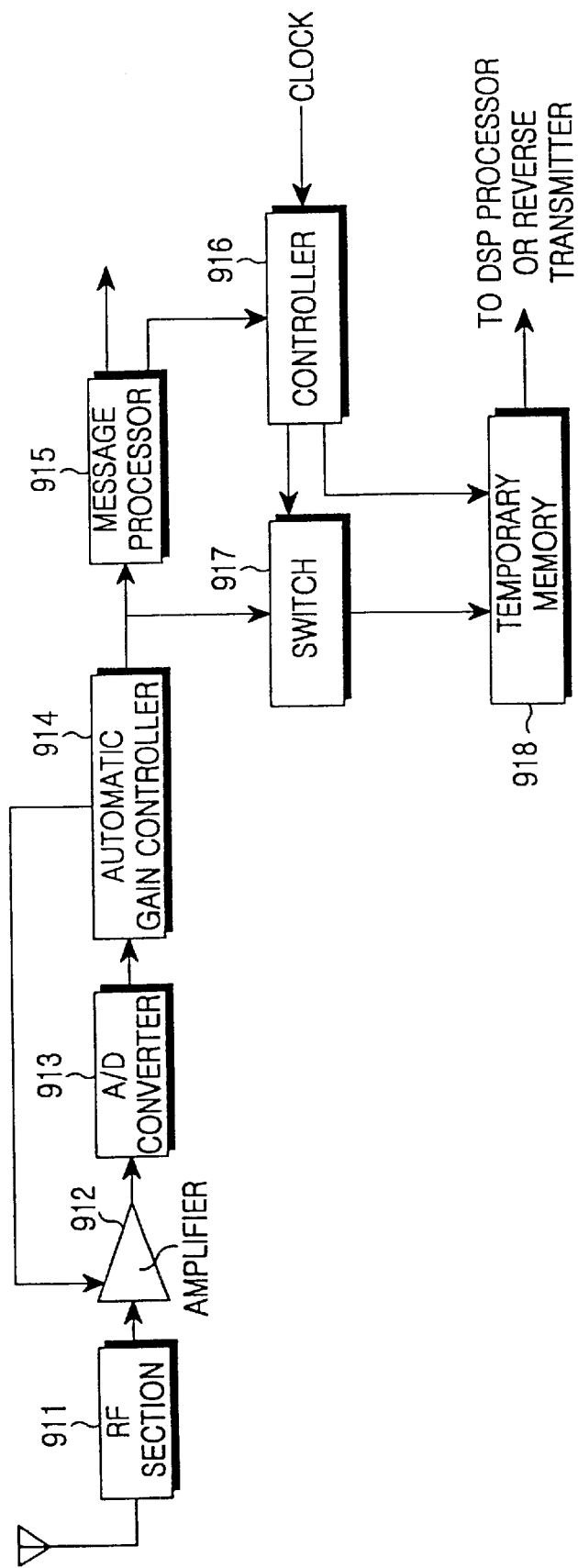
FIG. 9 is a diagram illustrating the construction of a mobile station receiver for receiving/storing forward channel signals according to an embodiment of the present invention.

FIG. 9 shows a mobile station receiver according to an embodiment of the present invention. Referring to FIG. 9, an RF (Radio Frequency) section 911 downs an RF signal received via an antenna to an IF (Intermediate Frequency) signal and converts the IF signal to a baseband signal. An amplifier 912 amplifies an output signal of the RF section 911 within a dynamic range of an A/D converter 913 under the control of an automatic gain controller 914. The A/D converter 913 converts an output signal of the amplifier 912 to a digital signal through sampling and quantization. The automatic gain controller 914 controls the gain of the amplifier 912 such that the range of the output signal of the amplifier 912 maintains a predetermined level. A message modulator 915 restores received data through dispreading and decoding procedures. Here, control message data are supplied to a controller 916. The controller 916 receives the restored message data from the message modulator 915 and performs a control operation according to the control message.

Also, during a mobile station positioning procedure, the controller 916 controls a switch 917 according to an FTP control time informed by a base station to assign an address to data input to a temporary memory 918 and then transfers data stored in the temporary memory 918 to a digital signal processor (DSP) or the base station. The switch 917 is turned on/off under the control of the controller 916 to transfer output data of the automatic gain controller 914 to the temporary memory 918. The temporary memory 918 stores the positioning data (i.e., chip sample data) received via the switch 917 under the control of the controller 916 in a corresponding address and then transmits the stored data to the DSP or a reverse link transmitter.

As described above, the mobile station receives and stores positioning data during the FTP control duration. The stored data is directly used in the mobile station positioning procedure or is transferred to a base or an upper system for performing the mobile station positioning procedure.

Hereafter, a description will be made as to message flow between a mobile station and base stations (i.e., a serving base station and neighboring base stations) for mobile station positioning.

While the base stations perform an FTP control at a scheduled time (or at a periodical time), the mobile station stores chip sample data in a temporary memory during the FTP control duration and detects pilot signals of the serving base station and the neighboring base stations from the stored chip sample data to calculate TDOAs between the pilot signals. Alternatively, the mobile station does not calculate the TDOAs, but transmits the chip sample data stored during the FTP control duration to a certain base station so that the base station can calculate a TDOA and position the mobile station.

There are five examples of a message communication method between a mobile station and base stations (i.e., a serving base station and neighboring base stations) for mobile station positioning.

In a first method, the mobile station stores chip sample data in a temporary memory during an FTP control duration of the serving base station and the neighboring base stations and then detects pilot signals of the base stations via a correlator through an off-line processing. The mobile station calculates TDOAs from the pilot signals and receives geographic information of the base stations so as to determine its location. In this case, the mobile station gives a knowledge of its location to a base station at periodical intervals or every time the base station requests such information.

In a second method, the mobile station stores chip sample data in a temporary memory during an FTP control duration of the serving base station and the neighboring base stations and then calculates TDOAs through off-line processing. The mobile station transmits the TDOAs to a base station so that the base station or an upper system positions the mobile station. According to this method, the mobile station does not have to receive geographic information of the base stations or its position, thus reducing an operational load of the mobile station.

In a third method, the mobile station stores chip sample data in a temporary memory during an FTP control duration of the serving base station and the neighboring base stations and then transmits the data stored in the memory to a base station, so that the base station or an upper system can position the mobile station. Since the base station or the upper system is in full charge of TDOA calculation, the amount of calculations at the mobile station are less than in the second method.

In a fourth method, the mobile station stores chip sample data continuously during several FTP control durations. Subsequently, the mobile station performs the positioning procedure as described in the above three methods.

In a fifth method, the mobile station stores chip sample data in a temporary memory buffer during several (at least two) FTP control durations and then transmits the chip sample data stored in the temporary memory buffer to a base station as requested. This method enables a base station to position the mobile station or update information about the location of the mobile station every time it is necessary.

Now, reference will be made in connection with FIG. 10 as to examples of a message flow between a mobile station and base stations (i.e., a serving base station and neighboring base stations) according to an embodiment of the present invention based on the above-described five methods.

Figure 10A:
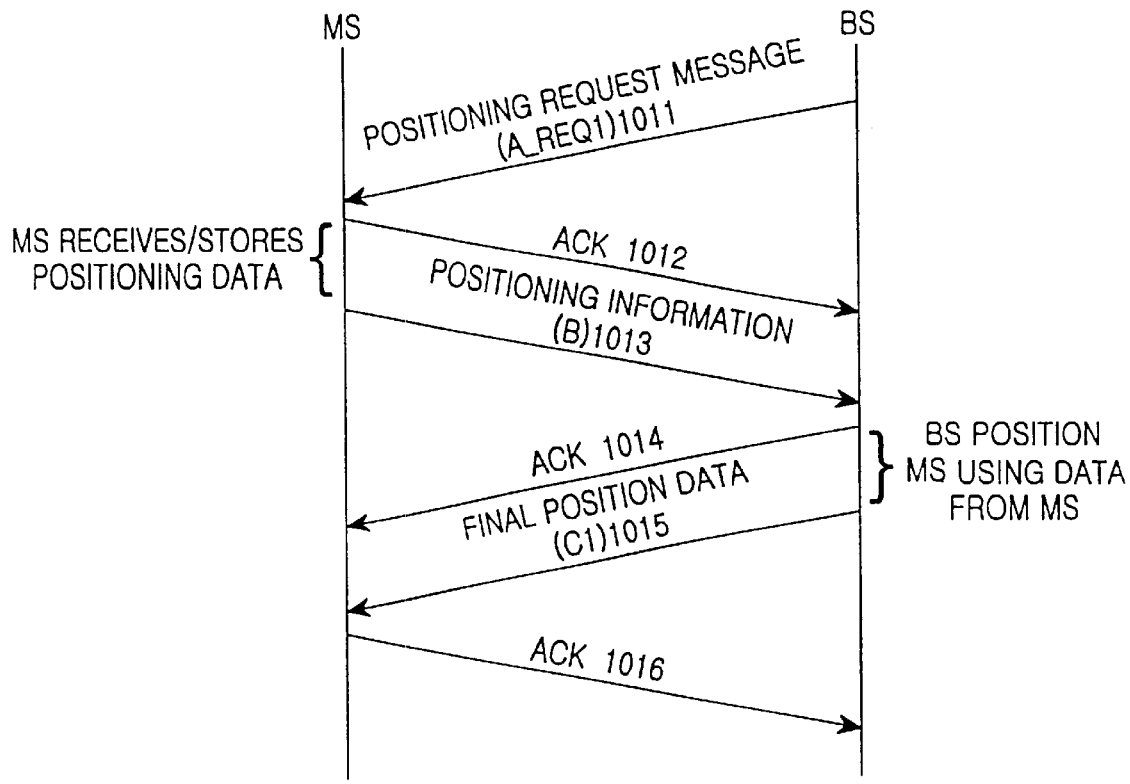
FIGS. 10A–10F are diagrams illustrating a message flow between a mobile station and base stations for mobile station positioning according to an embodiment of the present invention.

FIG. 10A illustrates a message flow according to an embodiment of the present invention in a case where a base station positions a mobile station.

Referring to FIG. 10A, a base station sends a positioning request message A_REQ1 to a mobile station in step 1011. Here, the positioning request message is a command that the mobile station should transmit recently received positioning data, or receive and store mobile station positioning data for several times. The positioning request message includes the FTP control time and the FTP control duration of a serving base station and neighboring base stations. Upon receiving the positioning request message, the mobile station sends an acknowledgment signal ACK to the base station in step 1012. The mobile station receives and stores positioning information during the FTP control duration and, in step 1013, transmits the stored positioning information B to the base station. Examples of the positioning information B include chip sample data (i.e., received at the mobile station during the FTP control duration of the base station) and the data reception time.

For example, in a case where the mobile station receives a global positioning system (GPS) satellite signal from a GPS satellite, examples of pseudo range between the mobile station and the GPS satellite calculated from chip sample data or the GPS satellite signal may include pseudo range data between the mobile station and the GPS satellite obtained without a propagation delay, or obtained through ionospheric delay compensation, atmospheric delay compensation and Doppler shift compensation.

Upon receiving the positioning information, the base station sends an acknowledgment signal ACK to the mobile station in step 1014, and determines the location of the mobile station from the positioning information. This mobile station positioning procedure will now be described as follows. First, when the mobile station transmits chip sample data received during the FTP control duration, the base station calculates reception power of the earliest pilot signals and TDOAs between the earliest pilot signals from the chip sample data and positions the mobile station. If the mobile station transmits a GPS satellite signal received from a GPS satellite, the base station calculates a compensated pseudo range from the GPS satellite signal and positions the mobile station from the DGPS (Doppler GPS) compensated pseudo range.

Following positioning of the mobile station, the base station transmits the final position data C1 to the mobile station in step 1015, and the mobile station sends an acknowledgment signal ACK to the base station in step 1016. The final position data C1 may include information indicating the geographical location of the mobile station, e.g., geographical designation, road and address as well as latitude, longitude and altitude.

Figure 10B:
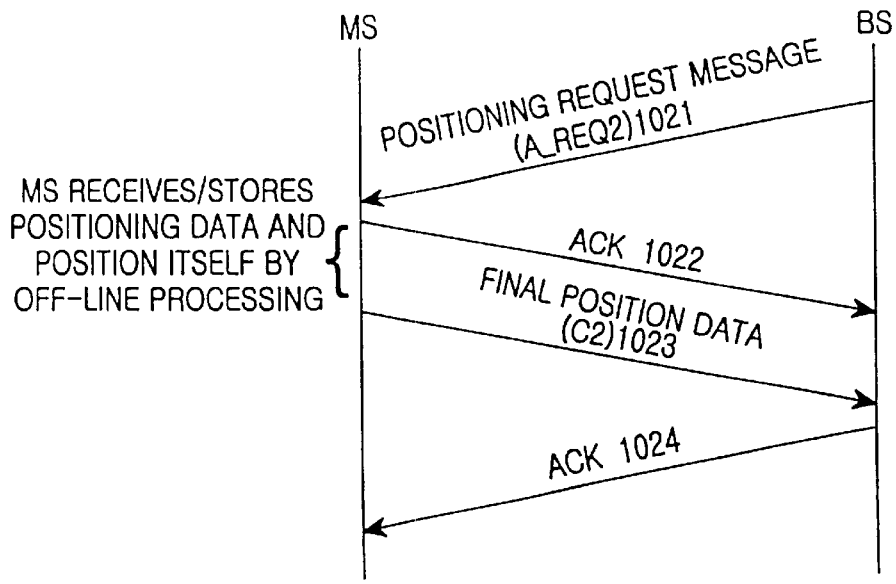

FIG. 10B illustrates a message flow according to an embodiment of the present invention in a case where a mobile station positions itself.

Referring to FIG. 10B, a base station sends a positioning request message A_REQ2 to the mobile station in step 1021. The base station gives positioning information of neighboring base stations to the mobile station. Here, the positioning request message A_REQ2 is a command that the mobile station should determine the location of itself and transmit it to the base station, and includes geographical information of the service base, station and the neighboring base stations such as latitude, longitude and altitude. The mobile station sends an acknowledgment signal ACK to the base station in step 1022. The mobile station receives and stores the positioning information from the base station and calculates TDOAs and sends its positioning information C1 to the base station, in step 1023. The mobile station positioning information C1 includes the geographical data of the mobile station such as latitude, longitude and altitude, or relative position of the mobile station with respect to the serving base station and the neighboring base station. The base station sends an acknowledgment signal ACK to the mobile station in step 1024.

Figure 10C:
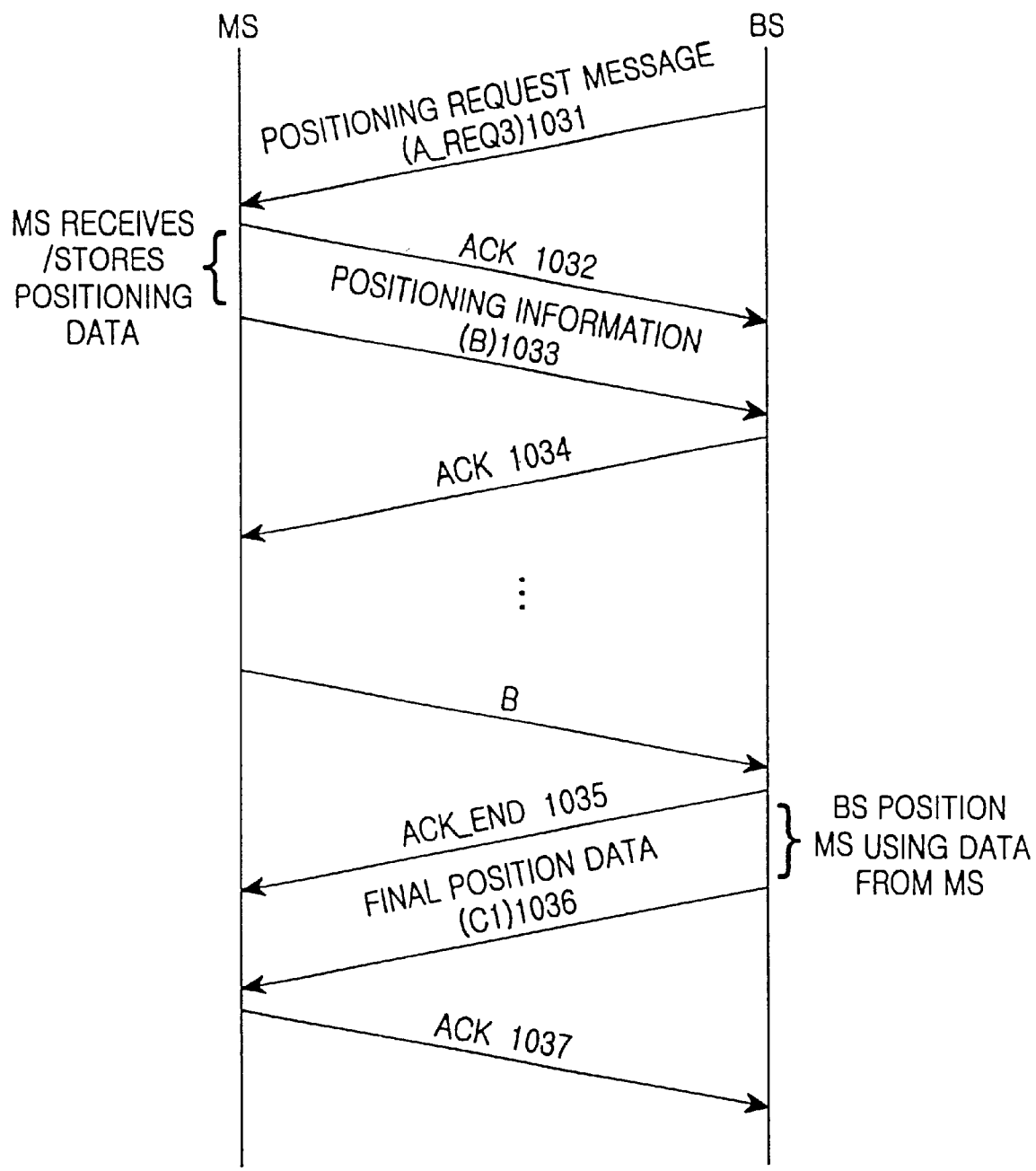

FIG. 10C illustrates a message flow according to an embodiment of the present invention in a case where a base station positions a mobile station using positioning information accumulated for several times.

Referring to FIG. 10C, the base station sends a positioning request message A_REQ3 to the mobile station in step 1031. The position request message A_REQ3 is a command that the mobile station should receive positioning data such as chip sample data at least twice during the FTP control durations of the respective base stations and transmit the stored positioning data to the base station. Here, the positioning request message includes information about FTP control times, FTP control durations and intervals (in a case where the FTP control is performed at periodical intervals). The mobile station sends an acknowledgment signal ACK to the base station in step 1032. The mobile station receives/stores the positioning data and transmits the stored positioning data B to the base station in step 1033. Although this example states that the positioning data are chip sample data received at the mobile station during the FTP control duration of each base station, the positioning data can be GPS data as shown in FIG. 10A.

The base station transmits an acknowledgment signal ACK to the mobile station in 1034. The above procedure is repeatedly performed until the base station gathers data sufficient to position the mobile station. In step 1035, the base station sends a data transmission ending request message ACK_END to the mobile station. The base station positions the mobile station from the positioning data and transmits the final position data C1 of the mobile station to the mobile station, in step 1036. Then, the mobile station transmits an acknowledgment signal ACK to the base station in step 1037.

Figure 10D:
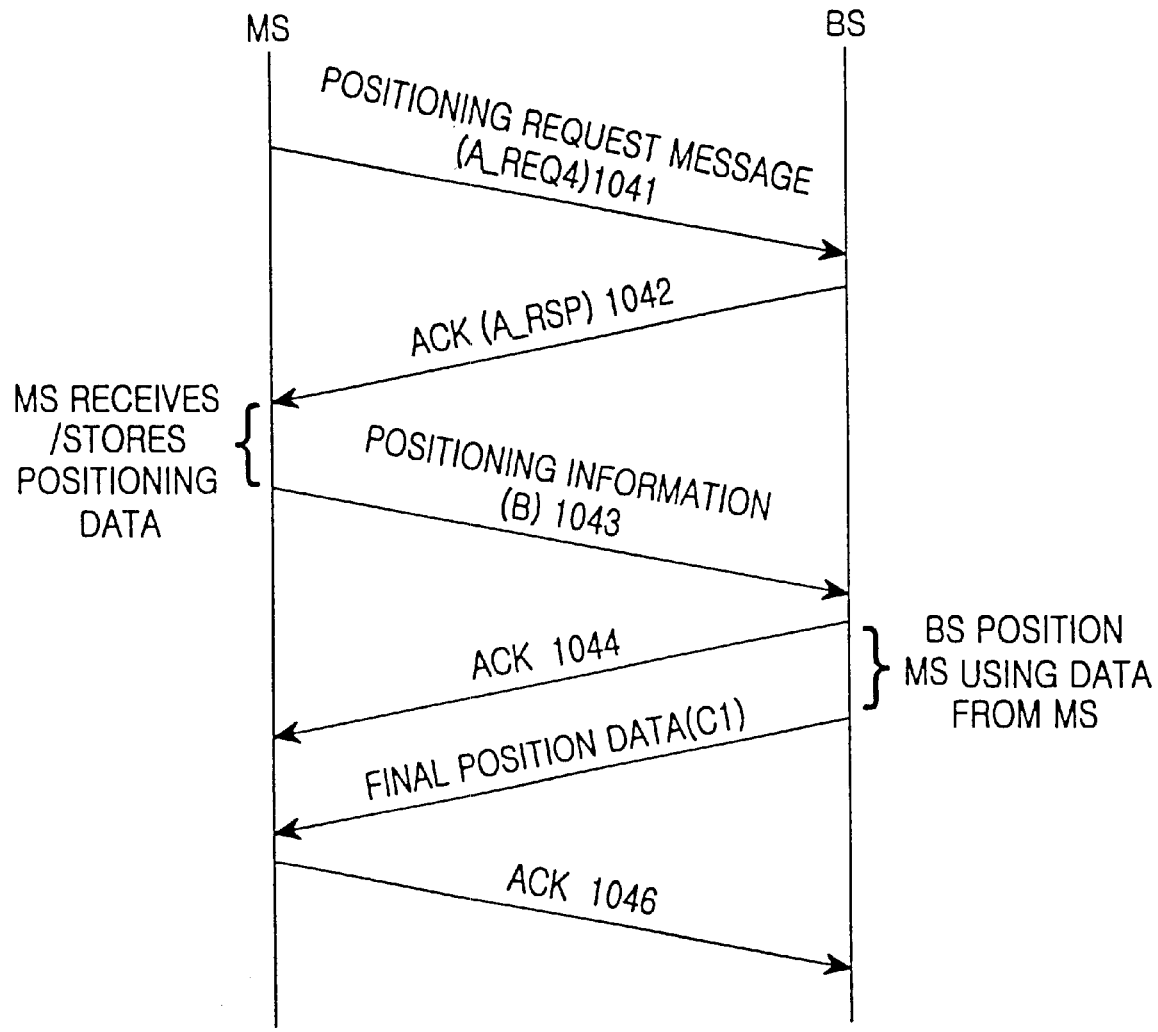

FIG. 10D illustrates a message flow according to an embodiment of the present invention in a case where a mobile station requests a base station to position it.

Referring to FIG. 10D, the mobile station sends a positioning request message A_REQ4 to the base station in step 1041. The base station sends an acknowledgment signal ACK and a positioning data request message to the mobile station, in step 1042. Then, the mobile station receives/stores positioning data and transmits the stored positioning data B to the base station in step 1043. The base station transmits an acknowledgment signal ACK to the mobile station and positions the mobile station from the received positioning data B in step 1044. The base station transmits the final position data C1 to the mobile station in step 1045, and the mobile station transmits an acknowledgment signal ACK to the base station in step 1046.

Figure 10E:
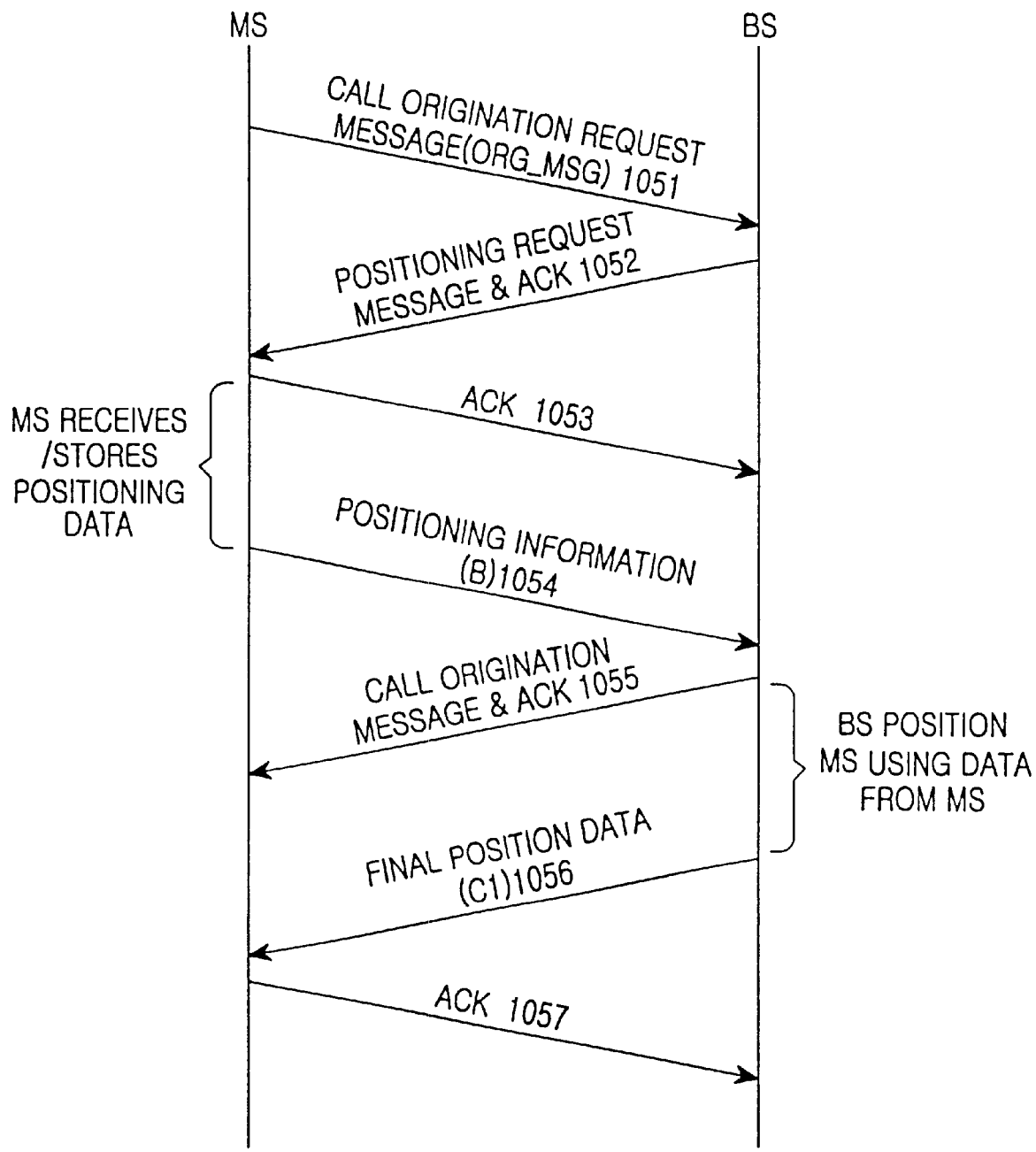

FIG. 10E illustrates a message flow according to an embodiment of the present invention in a case where a base station positions a mobile station prior to traffic channel assignment.

Referring to FIG. 10E, the mobile station sends a call origination request message ORG_MSG to the base station in step 1051. The base station transmits an acknowledgment signal ACK and a positioning request message A_REQ1 to the mobile station in step 1052. The positioning request message A_REQ1 is a command that the mobile station should receive positioning data and transmit them to the base station. The mobile station transmits an acknowledgment signal ACK to the base station in step 1053. Then, the mobile station receives/stores the positioning data and transmits the stored positioning data B to the base station in step 1054. The base station sends an acknowledgment signal ACK and a traffic channel assignment message CA_MSG (defined in the IS-95 standard) to the mobile station in step 1055. The base station transmits to the mobile station the final position data C1 about the mobile station calculated from the positioning data received from the mobile station in step 1056. The mobile station then transmits an acknowledgment signal ACK to the base station in step 1057.

Figure 10F:
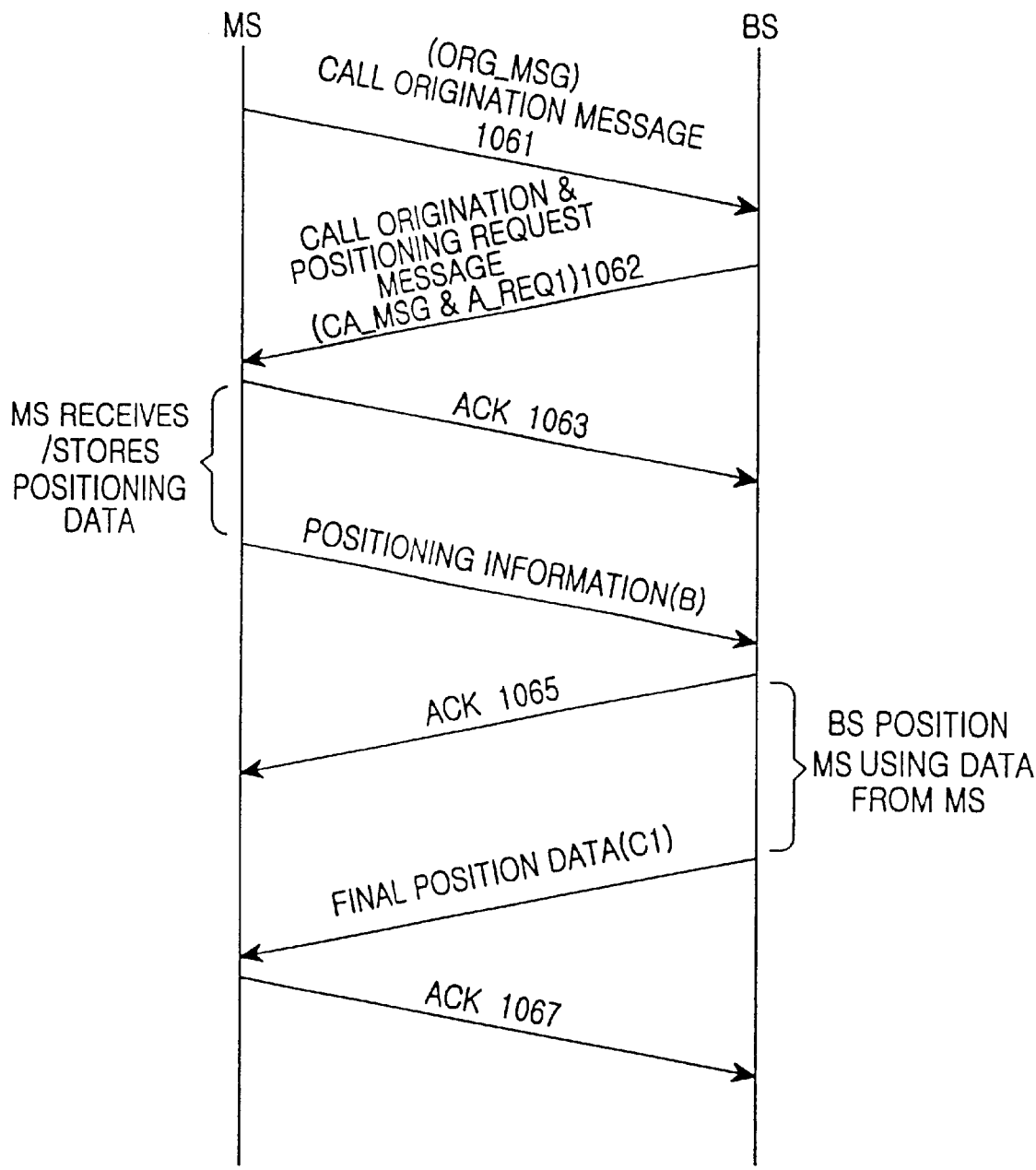

FIG. 10F illustrates a message flow according to an embodiment of the present invention in a case where a base station positions a mobile station after traffic channel assignment.

Referring to FIG. 10F, the mobile station sends a call origination request message ORG_MSG to the base station in step 1061. The base station sends a positioning message A_REQ1 and a traffic channel assignment request message CA_MSG to the mobile station in step 1062. The mobile station transmits an acknowledgment signal ACK to the base station in step 1063. The mobile station receives/stores positioning data from the base station and transmits the stored positioning data B to the base station in step 1064. Then, the base station transmits an acknowledgment signal ACK to the mobile station and positions the mobile station from the received positioning data B in step 1065. The base station transmits the final position data C1 about the mobile station to the mobile station in step 1066. The mobile station then transmits an acknowledgment,signal ACK to the base station in step 1067.

Next, a description will be made regarding a method for positioning a mobile station from TDOAs or TOAs.

A method for determining a relative location of the mobile station with respect to base stations using at least three TDOAs or TOAs is mathematically well known in the related art. For more accurate and rapid positioning, there can be employed a method for selectively using TDOAs or TOAs calculated from reliable signals in a positioning algorithm, or a method for selectively using TDOAs or TOAs for base stations having a minimum PDOP (Position Dilution of Precision) in the positioning algorithm in consideration of the geometry of the base stations. The PDOP minimizing method is a two-dimensional application of a geometric DOP (GDOP) method used as a phase selection method at a GPS receiver. Another performance improving method is positioning a mobile station with TDOAs and adding reliability to the positioning data obtained using receiving power of pilot signals. The positioning algorithm used herein can be performed at the mobile station, the base station or the upper system.

Figure 11:
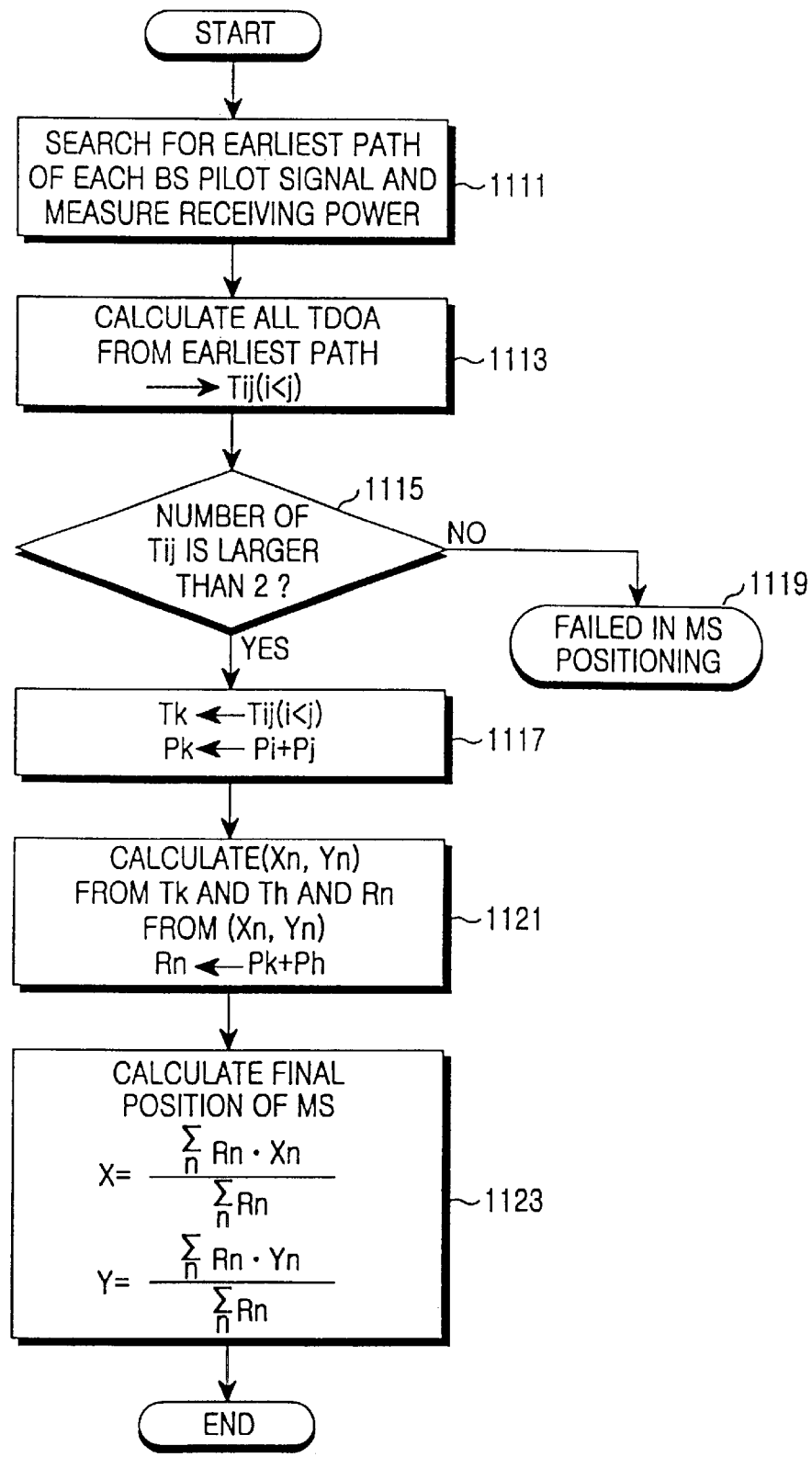
FIG. 11 is a flowchart illustrating a mobile station positioning procedure according to an embodiment of the present invention.

Now, reference will be made in connection with FIG. 11 as to a mobile station positioning method using reliability values of TDOAs.

First, a controller detects the earliest paths ($i=1, 2, \ldots, n$) among pilot channel signals received from a plurality of base stations and measures receiving power ($P_i, I=1, 2, \ldots$) of the earliest paths in step 1111. The controller calculates all possible TDOAs between the earliest paths in step 1113. Here, the TDOAs are replaced with a variable $T_{ij}$ (where i is different from j) which refers to the TDOA between the earliest path i received from a base station and the earliest path j received from another base station. That is, TDOA→$T_{ij}$ and $i<j$. Since n earliest paths of the pilot signals arrive from n base stations, the TDOAs are $T_{12}, T_{13}, \ldots, T_{1n}, T_{23}, T_{24}, \ldots, T_{2n}, T_{34}, T_{35}, \ldots, T_{3n}, \ldots, T_{n-2\,n-1}, T_{n-2\,n}$, and $T_{n-1\,n}$. Following calculation of all possible TDOAs, the controller checks on whether the number of TDOAs is greater than 2 (i.e., #($T_{ij}$)>2) in step 1115. If the number of TDOAs is greater than 2, the controller proceeds to step 1117; otherwise if the number of TDOAs is equal to or less than 2, the controller proceeds to step 1119 and confirms that it failed in the mobile station positioning procedure. After confirmation of the failure in the mobile station positioning, the controller makes the mobile station receive the above-mentioned positioning data from the base stations and receives the positioning data from the mobile station to perform the positioning algorithm again.

On the other hand, when the number of TDOAs exceeds 2, the controller replaces the Tij with Tk and the sum of Pi (=receiving power of pilot signals from base station i) and Pj (=receiving power of pilot signals from base station j) with Pk in step 1117. That is, Tk←Tij (i<j) and Pk←Pi+Pj, wherein k=1, 2, . . . , n(n−1)/2 and n(n−1)/2 is the total number of Tij. The controller determines an estimated position (Xn,Yn) and a weight of the estimated position (Xn,Yn) from Tk (k=1, 2, . . . , n(n−1)/2) and Th (h=1, 2, . . . , n(n−1)/2, h>k) in step 1121. Specifically, if n(n−1)/2=m, the controller calculates (X0,Y0) from T1 and T2, (X1,Y1) from T1 and T3, . . . , (Xm−2,Ym−2) from T1 and Tm, (Xm−1, Ym−1) from T2 and T3, (Xm,Ym) from T2 and T4, . . . , (X2m−4,Y2m−4) from T2 and Tm, (X2m−3,Y2m−3) from T3 and T4, (X2m−2,Y2m−2) from T3 and T5, . . . , (X3m−7,Y3m−7) from T3 and Tm, . . . , and (Xg,Yg) from Tm−1 and Tm (wherein g=m(m−1)/2). The reliability value Rn is the sum of Pk and Ph (i.e., Rn←EPk+Ph, n=1, 2, 3, . . . , g).

Thereafter, the controller determines the final position (X, Y) of the mobile station according to Equation 2 in step 1123.

Equation 2:

$$X = \frac{\sum_n Rn \cdot Xn}{\sum_n Rn} \quad Y = \frac{\sum_n Rn \cdot Yn}{\sum_n Rn}$$

As described above, according to the positioning algorithm used in the present invention, the reliability of received signals is determined by the receiving power of the signals using TDOAs and relatively small numbers are set in positional coordinates that is determined by TDOAs calculated from the signals of low receiving power, assuming that the signals have lower receiving power due to relatively a long wave path or multipaths. Although the following description states that a mobile station receives pilot signals from three neighboring base stations other than a serving base station BS1, the algorithm suggested in the present invention is also applicable to more than three neighboring base stations.

Now, a description will be made as to three stages of the positioning algorithm using TDOAs in the present invention.

Hereinafter, receiving power of received pilot signals that a mobile station measures is referred to as Pi (i=0, 1; 2, 3) and a time required to transfer the pilot signals from a base station i to the mobile station is referred to as Tim.

First, the mobile station determines TDOAs, Tij (=Tim−Tjm, i≠j) for the pilot signals received from the respective base stations. The TDOAs, Tij thus calculated are The TDOAs (=Tij) and positioning information of the base stations are used to position the mobile station. The estimated position (X,Y) of the mobile station is determined from two TDOAs. This method was developed as a solution of mobile station positioning with TDOAs. For simplicity, T01, T02, T03, T12, T13 and T23 is called T1, T2, T3, T4, T5 and T6 (Tk, k=1, 2, . . . , 6) and the reliability value of Tk is called Pk (k=1, 2, . . . , 6). Then, the reliability value of the estimated position n=(Xn,Yn) is determined by adding reliability values of Tk and Th (k=1, 2, . . . , 6, h=2, 3, 4, 5, 6, k<h) used to calculate the estimated position (Xn,Yn).

The total number of estimated positions is N(N−1)/2 for N TDOAs. Therefore, 15 (=6×5/2) estimated positions of the mobile station are obtained in this embodiment. The reliability value Rn (n=1,2,3, . . . , 15) of each estimated position (Xn,Yn) is defined as Pk+Ph. Namely, the final position (X,Y) of the mobile station is calculated from n estimated positions according to Equation 2.

The estimated positions (Xn,Yn) and the reliability values Rn are listed in Table 1.

TABLE 1

| Tk | Tn |  | Estimated Position (Xn, Yn) | Reliability Rn |
|----|----|---|-----------------------------|----------------|
| T1 | T2 | → | (X1, Y1)  | R1  |
| T1 | T3 | → | (X2, Y2)  | R2  |
| T1 | T4 | → | (X3, Y3)  | R3  |
| T1 | T5 | → | (X4, Y4)  | R4  |
| T1 | T6 | → | (X5, Y5)  | R5  |
| T2 | T3 | → | (X6, Y6)  | R6  |
| T2 | T4 | → | (X7, Y7)  | R7  |
| T2 | T5 | → | (X8, Y8)  | R8  |
| T2 | T6 | → | (X9, Y9)  | R9  |
| T3 | T4 | → | (X10, Y10) | R10 |
| T3 | T5 | → | (X11, Y11) | R11 |
| T3 | T6 | → | (X12, Y12) | R12 |
| T4 | T5 | → | (X13, Y13) | R13 |
| T4 | T6 | → | (X14, Y14) | R14 |
| T5 | T6 | → | (X15, Y15) | R15 |

As described above, the present invention suggests a mobile station positioning method using signals received via forward channels from base stations. Although many studies have been made on mobile station positioning methods as per FCC demands, an efficient positioning method has not yet been developed. In a mobile station positioning method using channels in a CDMA communication system, significant interference between CDMA channels makes it difficult to measure signals transmitted from other base stations except for a handoff area out of a service cell. To solve this problem, the present invention enables a mobile station to acquire signals transmitted from other base stations in a wide area larger than the service cell, thus facilitating mobile station positioning. According to the present invention, the mobile station requires a memory buffer to store signals received during a defined time interval (FTP control duration) and the base stations have a mechanism for FTP control. The present invention presents some advantages in that the base station needs no hardware control and the mobile station positioning procedures can be implemented without performance degradation of the CDMA forward channels. The present invention makes it possible to position a mobile station in all areas of a cell. In addition, the present invention provides a service of good quality when considering errors caused by multipaths of signals, thereby satisfying the requirements of E911 as defined by the FCC.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A mobile station positioning method, wherein a mobile station receives signals synchronized and transferred from at least three neighboring base stations at a predetermined time, wherein the mobile station belongs to one serving base station out of the at least three neighboring base stations, the mobile station positioning method comprising the steps of:

at specified base stations of the at least three neighboring base stations, increasing transmission power of a specified common channel and reducing transmission power of other channels by more than a transmission power increment;

at the other base stations excepting the specified base stations, increasing transmission power of the specified common channel and reducing transmission power of other channels by the transmission power increment; and estimating a position of the mobile station by using arrival time differences of the signals transferred from the base stations received from the mobile station.

2. The mobile station positioning method as claimed in claim 1, wherein the specified common channel is a pilot channel.

3. The mobile station positioning method as claimed in claim 1, wherein the specified base stations and the other base stations perform the forward transmission power control during the same time interval.

4. The mobile station positioning method as claimed in claim 1, wherein the specified base stations and the other base stations perform the forward transmission power control during different time intervals.

5. The mobile station positioning method as claimed in claim 1, wherein the estimating step comprises the steps of:

calculating reliability values of the arrival time differences, wherein each of the reliability values is obtained by adding receiving power of two signals used to calculate a corresponding one of the arrival time differences;

calculating all possible estimated positions (Xn,Yn) obtained from combinations of the arrival time differences and determining weights Rn of the estimated positions, wherein a particular weight Rn is obtained by adding the reliability values of two arrival time differences used to calculate an estimated position; and calculating a final position (X,Y) of the mobile station using the estimated positions and the weights Rn according to the equation:

$$X = \frac{\sum_n Rn \cdot Xn}{\sum_n Rn} \quad Y = \frac{\sum_n Rn \cdot Yn}{\sum_n Rn}.$$

6. The mobile station positioning method as claimed in claim 1, wherein the serving base station performing the forward transmission power control increases transmission power of pilot channels during a traffic channel frame including a forward transmission power control duration.

7. A mobile station positioning method, wherein a mobile station receives signals synchronized and transferred from at least three neighboring base stations at a predetermined time, wherein the mobile station belongs to one serving base station out of the at least three neighboring base stations, the mobile station positioning method comprising the steps of:

at specified base stations of the at least three neighboring base stations, increasing transmission power of a specified common channel and reducing transmission power of other channels by more than a transmission power increment;

at the other base stations excepting the specified base stations, increasing transmission power of the specified common channel and reducing transmission power of other channels by the transmission power increment;

the serving base station receiving chip sample data of signals of at least three base stations received from the mobile station at a predetermined time;

calculating arrival time differences between two of the signals using the chip sample data; and determining a position of the mobile station from the arrival time differences.

8. The mobile station positioning method as claimed in claim 7, wherein the position of the mobile station is determined by:

calculating reliability values of the arrival time differences, wherein each of the reliability values is obtained by adding receiving power of two signals used to calculate a corresponding one of the arrival time differences;

calculating all possible estimated positions (Xn,Yn) obtained from combinations of the arrival time differences and determining weights Rn of the estimated positions, wherein a particular weight Rn is obtained by adding the reliability values of two arrival time differences used to calculate the estimated position; and calculating a final position (X,Y) of the mobile station using the estimated positions and weights Rn according to the equation:

$$X = \frac{\sum_n Rn \cdot Xn}{\sum_n Rn} \quad Y = \frac{\sum_n Rn \cdot Yn}{\sum_n Rn}.$$

9. A mobile station positioning method, wherein a mobile station receives signals synchronized and transferred from at least three neighboring base stations at a predetermined time, wherein the mobile station belongs to one serving base station out of the at least three neighboring base stations, the mobile station positioning method comprising the steps of:

at specified base stations of the at least three neighboring base stations, increasing transmission power of a specified common channel and reducing transmission power of other channels by more than a transmission power increment;

at the other base stations excepting the specified base stations, increasing transmission power of the specified common channel and reducing transmission power of other channels by the transmission power increment;

the mobile station receiving positioning information of the neighboring base stations from the serving base station;

receiving and storing chip sample data from the at least three base stations and then calculating arrival time differences between two of the signals using the stored chip sample data; and determining a position of the mobile station using the calculated arrival time differences and positioning information of the neighboring base stations.

10. The mobile station positioning method as claimed in claim 9, further comprising the step of reporting, at the mobile station, the determined position to the serving base station.

11. The mobile station positioning method as claimed in claim 9, wherein the position of the mobile station is determined by:

calculating reliability values of the arrival time differences, wherein each of the reliability values is obtained by adding receiving power of two signals used to calculate a corresponding one of the arrival time differences;

calculating all possible estimated positions (Xn,Yn) obtained from combinations of the arrival time differences and determining weights Rn of the estimated positions, wherein a particular weight Rn is obtained by adding the reliability values of two arrival time differences used to calculate the estimated position; and calculating a final position (X,Y) of the mobile station using the estimated positions and the weights Rn according to the equation:

$$X = \frac{\sum_n Rn \cdot Xn}{\sum_n Rn} \quad Y = \frac{\sum_n Rn \cdot Yn}{\sum_n Rn}.$$

12. A mobile station positioning method, wherein a mobile station receives signals synchronized and transferred from at least three neighboring base stations at a predetermined time, wherein the mobile station belongs to one serving base station out of the at least three neighboring base stations, the mobile station positioning method comprising the steps of:

performing a forward transmission power control at at least one of the at least three neighboring base stations;

calculating, at the mobile station, arrival time differences between at least two of the signals received from the at least three neighboring base stations;

transmitting, at the mobile station, the arrival time differences to the serving base station; and estimating, at the serving base station, a position of the mobile station using the arrival time differences;

wherein the estimating step comprises the steps of:

calculating reliability values of the arrival time differences, wherein each of the reliability values is obtained by adding receiving power of two signals used to calculate a corresponding one of the arrival time differences;

calculating all possible estimated positions (Xn,Yn) obtained from combinations of the arrival time differences and determining weights Rn of the estimated positions, wherein a particular weight Rn is obtained by adding the reliability values of two arrival time differences used to calculate an estimated position; and calculating a final position (X,Y) of the mobile station using the estimated positions and the weights Rn according to the equation:

$$X = \frac{\sum_n Rn \cdot Xn}{\sum_n Rn} \quad Y = \frac{\sum_n Rn \cdot Yn}{\sum_n Rn}.$$

13. A mobile station positioning method, wherein a mobile station receives signals synchronized and transferred from at least three neighboring base stations at a predetermined time, wherein the mobile station belongs to one serving base station out of the at least three neighboring base stations, the mobile station positioning method comprising the steps of:

performing a forward transmission power control at at least one of the three neighboring base stations;

transmitting, at the mobile station, chip sample data received from the at least three neighboring base stations during a forward transmission power duration to the serving base station; and calculating, at the serving base station, arrival time differences between two of the signals using the chip sample data and determining a position of the mobile station from the arrival time differences;

wherein the position of the mobile station is determined by:

calculating reliability values of the arrival time differences, wherein each of the reliability values is obtained by adding receiving power of two signals used to calculate a corresponding one of the arrival time differences;

calculating all possible estimated positions (Xn,Yn) obtained from combinations of the arrival time differences and determining weights Rn of the estimated positions, wherein a particular weight Rn is obtained by adding the reliability values of two arrival time differences used to calculate the estimated position; and calculating a final position (X,Y) of the mobile station using the estimated positions and weights Rn according to the equation:

$$X = \frac{\sum_n Rn \cdot Xn}{\sum_n Rn} \quad Y = \frac{\sum_n Rn \cdot Yn}{\sum_n Rn}.$$

14. A mobile station positioning method, wherein a mobile station receives signals synchronized and transferred from at least three neighboring base stations at a predetermined time, wherein the mobile station belongs to one serving base station out of the at least three neighboring base stations, the mobile station positioning method comprising the steps of:

transmitting, at the serving base station, positioning information of the neighboring base stations to the mobile station;

performing a forward transmission power control at at least one of the at least three neighboring base stations; and calculating, at the mobile station, arrival time differences between two of the signals received from the at least three neighboring base stations and determining a position of the mobile station using the arrival time differences;

wherein the position of the mobile station is determined by:

calculating reliability values of the arrival time differences, wherein each of the reliability values is obtained by adding receiving power of two signals used to calculate a corresponding one of the arrival time differences;

calculating all possible estimated positions (Xn,Yn) obtained from combinations of the arrival time differences and determining weights Rn of the estimated positions, wherein a particular weight Rn is obtained by adding the reliability values of two arrival time differences used to calculate the estimated position; and calculating a final position (X,Y) of the mobile station using the estimated positions and the weights Rn according to the equation:

$$X = \frac{\sum_n Rn \cdot Xn}{\sum_n Rn} \quad Y = \frac{\sum_n Rn \cdot Yn}{\sum_n Rn}.$$

* * * * *